United States Patent
Sakai

(10) Patent No.: US 11,363,153 B2
(45) Date of Patent: Jun. 14, 2022

(54) MEDIUM CONVEYING APPARATUS FOR DETERMINING WHETHER A CONVEYED MEDIUM IS ID CARD

(71) Applicant: PFU LIMITED, Kahoku (JP)

(72) Inventor: Masaaki Sakai, Kahoku (JP)

(73) Assignee: PFU LIMITED, Kahoku (JP)

( * ) Notice: Subject to any disclaimer, the term of this patent is extended or adjusted under 35 U.S.C. 154(b) by 39 days.

(21) Appl. No.: 16/985,055

(22) Filed: Aug. 4, 2020

(65) Prior Publication Data

US 2021/0084182 A1 Mar. 18, 2021

(30) Foreign Application Priority Data

Sep. 13, 2019 (JP) .............................. JP2019-167528

(51) Int. Cl.
*H04N 1/04* (2006.01)
*H04N 1/00* (2006.01)

(52) U.S. Cl.
CPC ....... *H04N 1/00748* (2013.01); *H04N 1/0057* (2013.01); *H04N 1/0071* (2013.01); *H04N 1/00724* (2013.01)

(58) Field of Classification Search
None
See application file for complete search history.

(56) References Cited

U.S. PATENT DOCUMENTS

| 9,560,228 B2* | 1/2017 | Aizono | H04N 1/0057 |
| 10,893,160 B2* | 1/2021 | Sakai | H04N 1/0071 |
| 2011/0278786 A1* | 11/2011 | Yamagishi | B65H 7/125 271/18 |
| 2013/0202185 A1* | 8/2013 | Irwin, Jr. | G06Q 30/00 382/137 |
| 2014/0077445 A1* | 3/2014 | Morikawa | H04N 1/3263 271/264 |
| 2016/0297635 A1* | 10/2016 | Hongo | B65H 7/06 |
| 2018/0220021 A1* | 8/2018 | Arimori | H04N 1/203 |
| 2019/0164313 A1* | 5/2019 | Ma | G06T 7/13 |
| 2020/0204695 A1* | 6/2020 | Sakai | H04N 1/00729 |
| 2021/0084181 A1* | 3/2021 | Sakai | H04N 1/00737 |
| 2021/0192260 A1* | 6/2021 | Pribble | G06K 9/3233 |
| 2021/0281699 A1* | 9/2021 | Motoyama | H04N 1/00708 |

FOREIGN PATENT DOCUMENTS

| JP | 2002049909 A | * | 2/2002 |
| JP | 2018-148362 A | | 9/2018 |

* cited by examiner

*Primary Examiner* — Cheukfan Lee
(74) *Attorney, Agent, or Firm* — Lewis Roca Rothgerber Christie LLP

(57) ABSTRACT

A medium conveying apparatus includes a conveying roller to convey a medium, an imaging device to generate an input image acquired by imaging the conveyed medium, and a processor to extract edge pixels from the input image, detect a degree of roundness at a corner of the medium in the input image based on the edge pixels, determine whether the conveyed medium is an ID card based on the degree of roundness, and control the conveying roller based on a result of the determination or outputs the result of the determination.

12 Claims, 17 Drawing Sheets

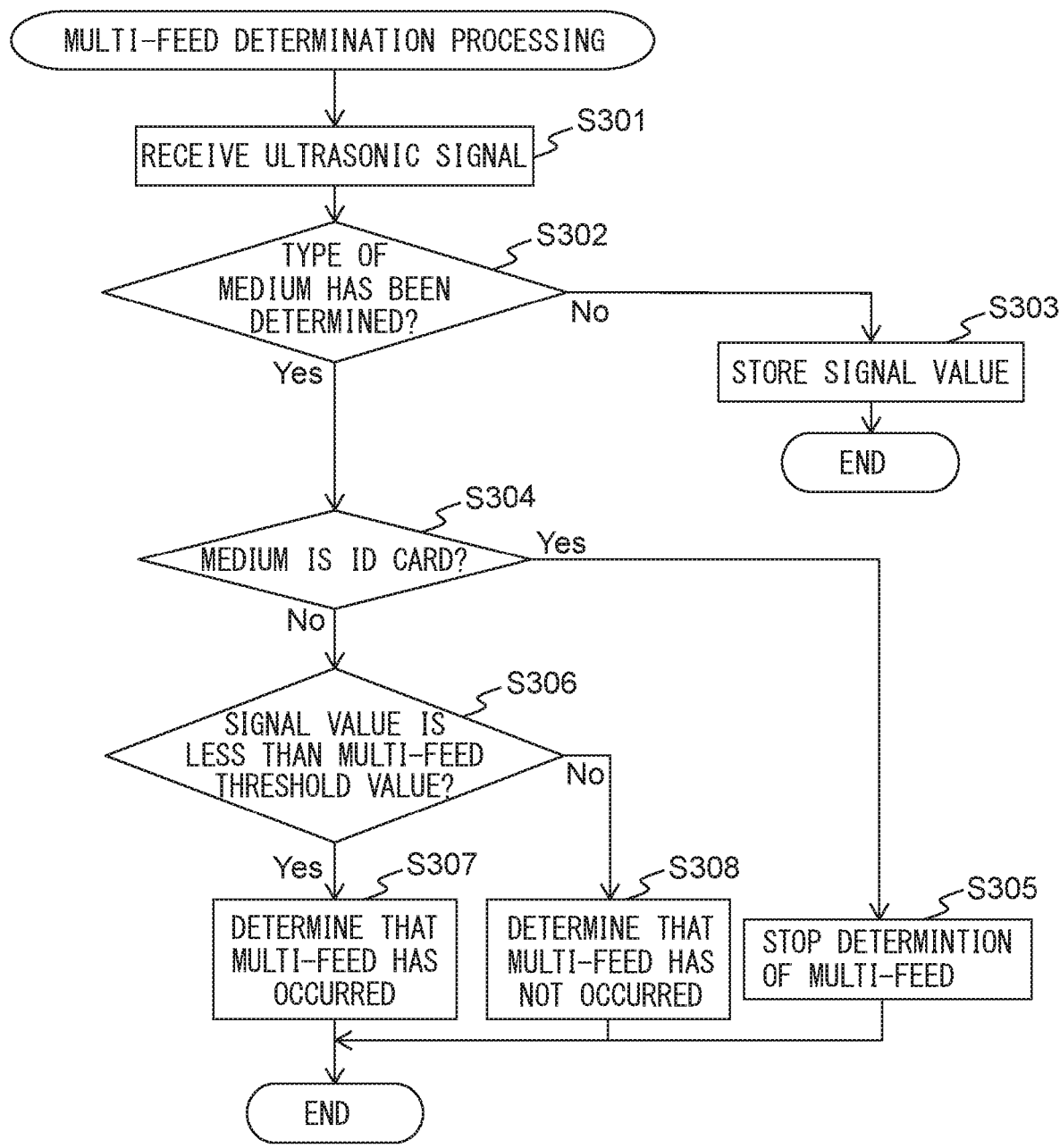

MEDIUM CONVEYING APPARATUS FOR DETERMINING WHETHER A CONVEYED MEDIUM IS ID CARD

CROSS-REFERENCE TO RELATED APPLICATIONS

This application is based upon and claims the benefit of priority of prior Japanese Patent Application No. 2019-167528, filed on Sep. 13, 2019, the entire contents of which are incorporated herein by reference.

TECHNICAL FIELD

Embodiments discussed in the present specification relate to medium conveyance.

BACKGROUND

A medium conveying apparatus such as a scanner that conveys a medium such as a document and reads an image of the conveyed medium has a function of detecting whether or not multi-feed in which a plurality of media are conveyed in an overlapped manner has occurred. In general, the medium conveying app includes an ultrasonic transmitter for transmitting an ultrasonic wave and an ultrasonic receiver for outputting a signal corresponding to the received ultrasonic wave, and detects multi-feed based on a signal output by the ultrasonic receiver when the medium is conveyed. However, the reception level of ultrasonic waves when plastic-made Identification (ID) card is conveyed as a medium is close to the reception level of ultrasonic waves when multi-feed of sheets occurs. Therefore, when the ID card is conveyed, it may be mistakenly determined that multi-feed has occurred. Further, in the medium conveying apparatus, it is also desired to classify an image acquired by reading an ID card and an image acquired by reading another medium. Therefore, in the medium conveying apparatus, it is desired to suitably determine whether or not the conveyed medium is an ID card.

In order to acquire an image including the entire document regardless of a shape of the document, an image forming apparatus that expands a reference range representing an outline of the document detected from the input image, sets the reference range as the range of the document image including the entire document, and outputs the document image, is disclosed (see Japanese Unexamined Patent Publication (Kokai) No. 2018-148362).

SUMMARY

According to some embodiments, a medium conveying apparatus includes a conveying roller to convey a medium, an imaging device to generate an input image acquired by imaging the conveyed medium, and a processor to extract edge pixels from the input image, detect a degree of roundness at a corner of the medium in the input image based on the edge pixels, determine whether the conveyed medium is an ID card based on the degree of roundness, and control the conveying roller based on a result of the determination or outputs the result of the determination.

According to some embodiments, a method for determining whether a conveyed medium is an ID card includes conveying a medium by a conveying roller, generating an input image acquired by imaging the conveyed medium by an imaging device, extracting edge pixels from the input image, detecting a degree of roundness at a corner of the medium in the input image based on the edge pixels, determining whether the conveyed medium is an ID card based on the degree of roundness, and controlling the conveying roller based on a result of the determination or outputting the result of the determination.

According to some embodiments, a computer program causes a medium conveying apparatus including a conveying roller to convey a medium, and an imaging device to generate an input image acquired by imaging the conveyed medium, to execute a process including extracting edge pixels from the input image, detecting a degree of roundness at a corner of the medium in the input image based on the edge pixels, determining whether the conveyed medium is an ID card based on the degree of roundness, and controlling the conveying roller based on a result of the determination or outputting the result of the determination.

BRIEF DESCRIPTION OF DRAWINGS

FIG. 8 is a flowchart illustrating the operation example of the multi-feed determination processing.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
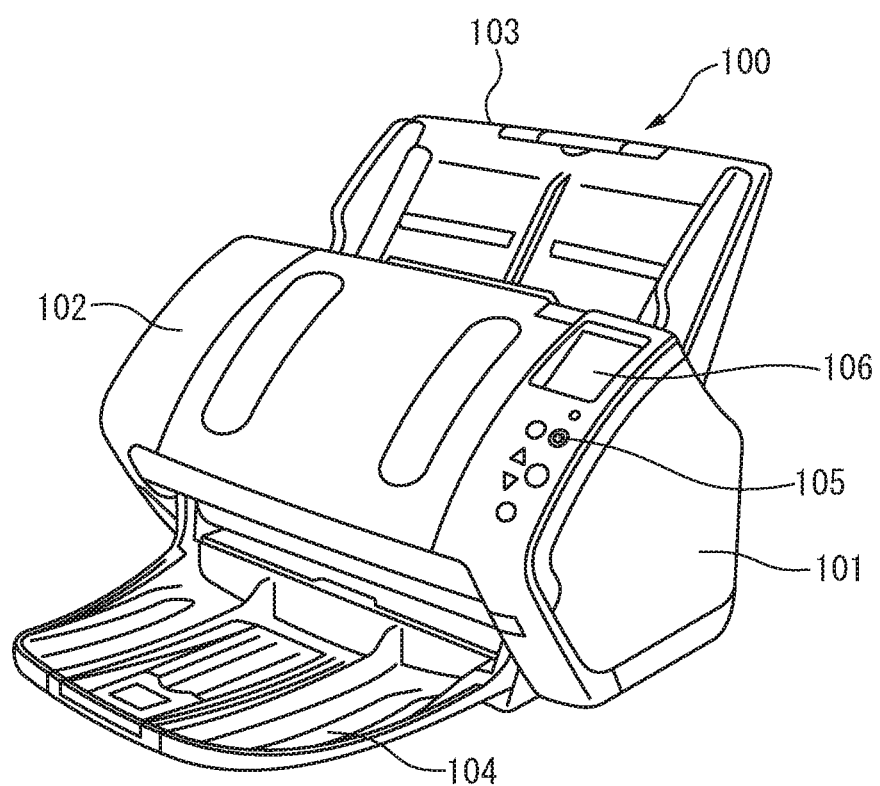
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. A medium is paper, thick paper, a card, a brochure, a passport, etc. For example, a card is a plastic resin card (plastic card). The card is, for example, an identification card having IC (Integrated Circuit) chips or magnetic stripes in which authentication information is stored, or having a user's name, photograph, etc., printed on its surface. Particularly, a card is an identification (ID) card defined by International Organization for Standardization (ISO)/International Electrotechnical Commission (IEC) 7810. A card may be another type of card. The medium conveying apparatus 100 may be a fax machine, a copying machine, a multifunctional peripheral (MFP), etc.

The medium conveying apparatus 100 includes a lower housing 101, an upper housing 102, a medium tray 103, an ejection tray 104, an operation device 105, and a display device 106.

The upper housing 102 is located in a position covering a top surface of the medium conveying apparatus 100, and is engaged with the lower housing 101. The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
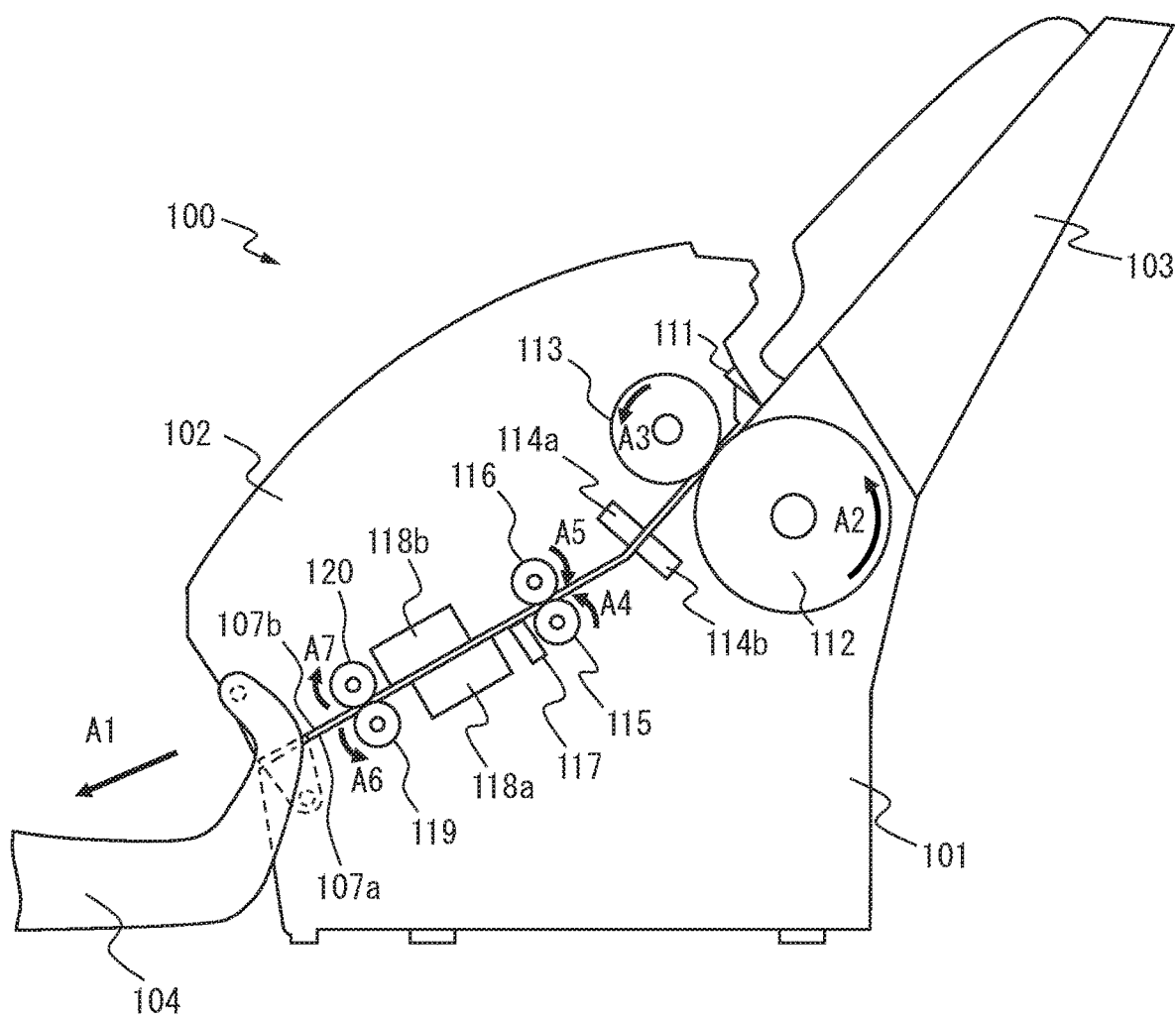
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes a first medium sensor 111, a feed roller 112, a brake roller 113, an ultrasonic transmitter 114a, an ultrasonic receiver 114b, a first conveyance roller 115, a second conveyance roller 116, a first medium sensor 117, a first imaging device 118a, a second imaging device 118b, a third conveyance roller 119, and a fourth conveyance roller 120, etc. The numbers of each roller is not limited to one, and may be plural.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The first medium sensor 111 includes a contact detection sensor and detects whether or not a medium is placed on the medium tray 103. The first medium sensor 111 generates and outputs a medium detection signal changing the signal value between a state in which a medium is placed on the medium tray 103 and a state in which a medium is not placed.

The ultrasonic transmitter 114a and the ultrasonic receiver 114b are examples of an ultrasonic transmission module and an ultrasonic reception module, respectively. The ultrasonic transmitter 114a and the ultrasonic receiver 114b are provided on the downstream side of the feed roller 112 and the brake roller 113, and also on the upstream side of the first conveyance roller 115 and the second conveyance roller 116, i.e., on the upstream side of the first imaging device 118a and the second imaging device 118b. The ultrasonic transmitter 114a and the ultrasonic receiver 114b are located close to the conveyance path of a medium in such a way as to face one another with the conveyance path in between. The ultrasonic transmitter 114a outputs an ultrasonic wave. On the other hand, the ultrasonic receiver 114b receives an ultrasonic wave being transmitted by the ultrasonic transmitter 114a and passing through a medium, and generates and outputs an ultrasonic signal being an electric signal corresponding to the received ultrasonic wave. The ultrasonic transmitter 114a and the ultrasonic receiver 114b may be hereinafter collectively referred to as an ultrasonic sensor 114.

The second medium sensor 117 is arranged on the downstream side of the first conveyance roller 115 and the second conveyance roller 116, and on the upstream side of the first imaging device 118a and the second imaging device 118b, in the medium conveying direction A1. The second medium sensor 117 includes a light emitter and a light receiver that are provided on one side of the medium conveyance path (upper housing 102). The second medium sensor 117 includes a reflection member, such as a mirror, provided at a position facing the light emitter and the light receiver with the conveyance path in between. The light emitter projects light toward the conveyance path. On the other hand, the light receiver receives light projected by the light emitter and reflected by the reflection member, and generates and outputs a second medium signal being an electric signal based on intensity of the received light. When a medium exists at a position of the second medium sensor 117, light projected by the light emitter is shaded by the medium. A signal value of the second medium signal varies between a state in which a medium exists at the position of the second medium sensor 117 and a state in which a medium does not exist. Thereby, the second medium sensor 117 detects whether or not the medium exists at the position of the second medium sensor 117, and detects the conveyed medium. The light emitter and the light receiver of the second medium sensor 117 may be provided at positions facing one another with the conveyance path in between, and the reflection member may be omitted.

The first imaging device 118a includes a line sensor based on a unity-magnification optical system type contact image sensor (CIS) including an imaging element based on a complementary metal oxide semiconductor (CMOS) linearly located in a main scanning direction. Further, the first imaging device 118a includes a lens for forming an image on the imaging element, and an A/D converter for amplifying and analog-digital (A/D) converting an electric signal output from the imaging element. The first imaging device 118a images a front surface of a medium conveyed by the feed roller 112, the brake roller 113, the first conveyance roller 115, and the second conveyance roller 116. The first imaging device 118a sequentially generates and outputs a line image acquired by imaging an area of a conveyed medium facing the line sensor, at certain intervals. Specifically, a pixel count of a line image in a vertical direction (subscanning direction) is 1, and a pixel count in a horizontal direction (main scanning direction) is larger than 1.

Similarly, the second imaging device 118b includes a line sensor based on a unity-magnification optical system type CIS including an imaging element based on a CMOS linearly located in a main scanning direction. Further, the second imaging device 118b includes a lens for forming an image on the imaging element, and an A/D converter for amplifying and A/D converting an electric signal output from the imaging element. The second imaging device 118b images the back side of a medium being conveyed by the feed roller 112, the brake roller 113, the first conveyance roller 115, and the second conveyance roller 116. The second imaging device 118b sequentially generates and outputs a line image acquired by imaging an area of a conveyed medium facing the line sensor, at certain intervals.

Only either of the first imaging device 118a and the second imaging device 118b may be located in the medium conveying apparatus 100 and only one surface of a medium may be read. Further, a line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs. The first imaging device 118a and the second imaging device 118b may be collectively referred to as imaging devices 118. The imaging device 118 is an example of imaging module. The one or a plurality of line images generated by the imaging device 118 are an example of an input image acquired by imaging a conveyed medium.

A medium placed on the medium tray 103 is conveyed between the lower guide 107a and the upper guide 107b in the medium conveying direction A1 by the feed roller 112 rotating in a direction of an arrow A2 in FIG. 2. When a medium is conveyed, the brake roller 113 rotate in a direction of an arrow A3. By the workings of the feed rollers 112 and the brake roller 113, when a plurality of media are placed on the medium tray 103, only a medium in contact with the feed roller 112, out of the media placed on the medium tray 103, is separated. Consequently, the medium conveying apparatus 100 operates in such a way that conveyance of a medium other than the separated medium is restricted (prevention of multi-feed).

A medium is fed between the first conveyance roller 115 and the second conveyance roller 116 while being guided by the lower guide 107a and the upper guide 107b. The medium is fed between the first imaging device 118a and the second imaging device 118b by the first conveyance roller 115 and the second conveyance roller 116 rotating in directions of an arrow A4 and an arrow A5, respectively. The medium read by the imaging devices 117 is ejected on the ejection tray 104 by the third conveyance roller 119 and the fourth conveyance roller 120 rotating in directions of an arrow A6 and an arrow A7, respectively. The feed roller 112, the brake roller 113, the first conveyance roller 115, and the second conveyance roller 116 are examples of a conveying roller for conveying a medium.

Figure 3:
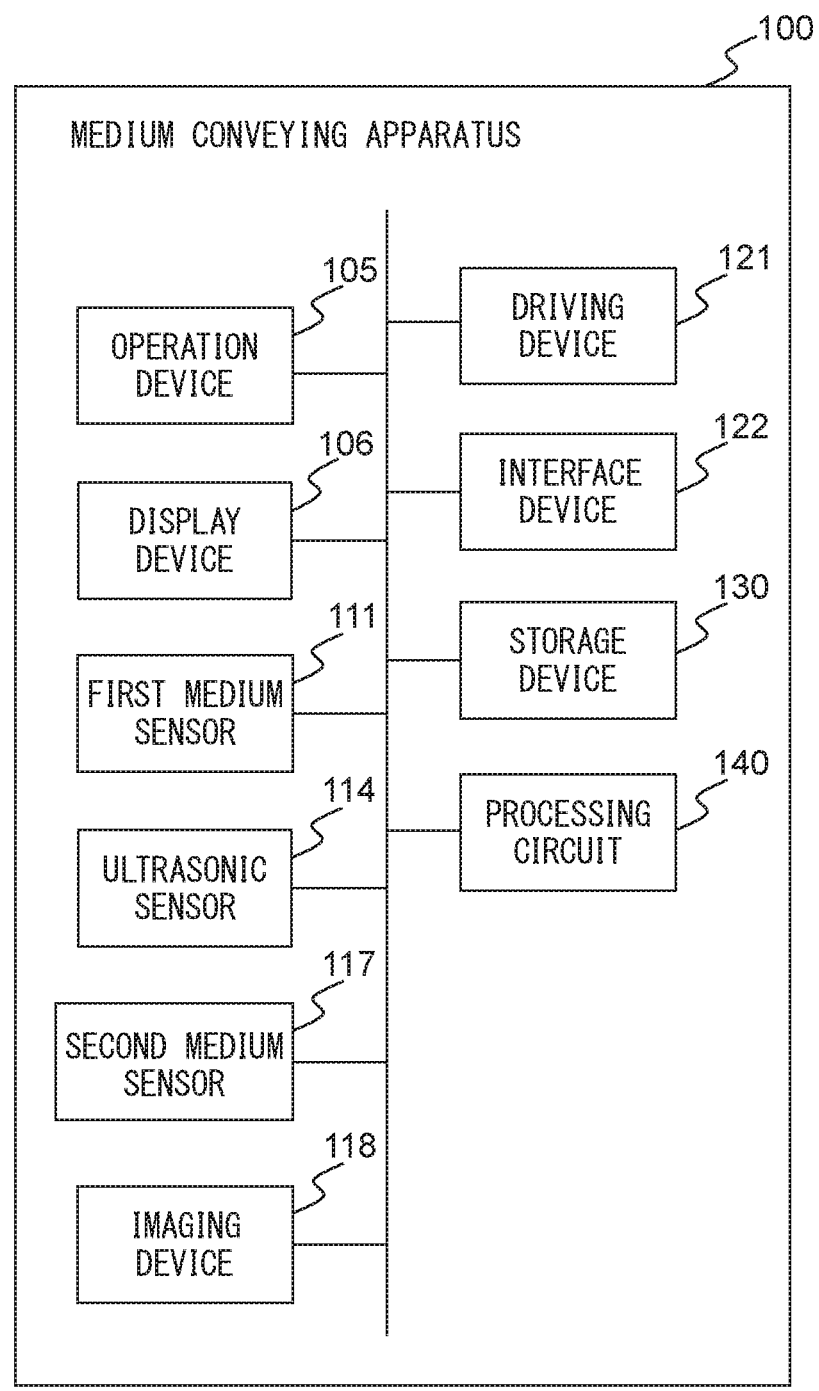
FIG. 3 is a block diagram illustrating a schematic configuration of the medium conveying apparatus 100.

FIG. 3 is a block diagram illustrating a schematic configuration of the medium conveying apparatus 100.

The medium conveying apparatus 100 further includes a driving device 121, an interface device 122, a storage device 130, and a processing circuit 140, etc., in addition to the configuration described above.

The driving device 121 includes one or a plurality of motors, and conveys a medium by rotating the feed roller 112, the brake roller 113, and the first to fourth conveyance rollers 115, 116, 119, and 120, by a control signal from the processing circuit 140.

For example, the interface device 122 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 122. For example, the predetermined communication protocol is a wireless local area network (LAN).

The storage device 130 includes a memory device such as a random access memory (RAM) or a read only memory (ROM), a fixed disk device such as a hard disk, or a portable storage device such as a flexible disk or an optical disk. Further, the storage device 130 stores a computer program, a database, a table, etc., used for various types of processing in the medium conveying apparatus 100. The computer program may be installed on the storage device 130 from a computer-readable, non-transitory medium such as a compact disc read only memory (CD-ROM), a digital versatile disc read only memory (DVD-ROM), etc., by using a well-known setup program, etc.

For example, the processing circuit 140 is a processor, such as a central processing unit (CPU). The processing circuit 140 operates in accordance with a program previously stored in the storage device 130. The processing circuit 140 may be a digital signal processor (DSP), a large scale integration (LSI), an application specific integrated circuit (ASIC), a field-programmable gate array (FPGA), etc.

The processing circuit 140 is connected to the operation device 105, the display device 106, the first medium sensor 111, the ultrasonic sensor 114, the second medium sensor 117, the imaging devices 118, the driving device 121, the interface device 122, the storage device 130, etc., and controls each of these units. The processing circuit 140 performs drive control of the driving device 121, imaging control of the imaging devices 117, etc., acquires an image, and transmits the image to an unillustrated information processing apparatus through the interface device 142. Further, the processing circuit 140 determines whether or not a conveyed medium is an ID card based on the input image generated by the imaging device 118, controls the conveying roller based on a result of the determination, or transmits the result of the determination to the information processing apparatus via the interface device 122.

Figure 4:
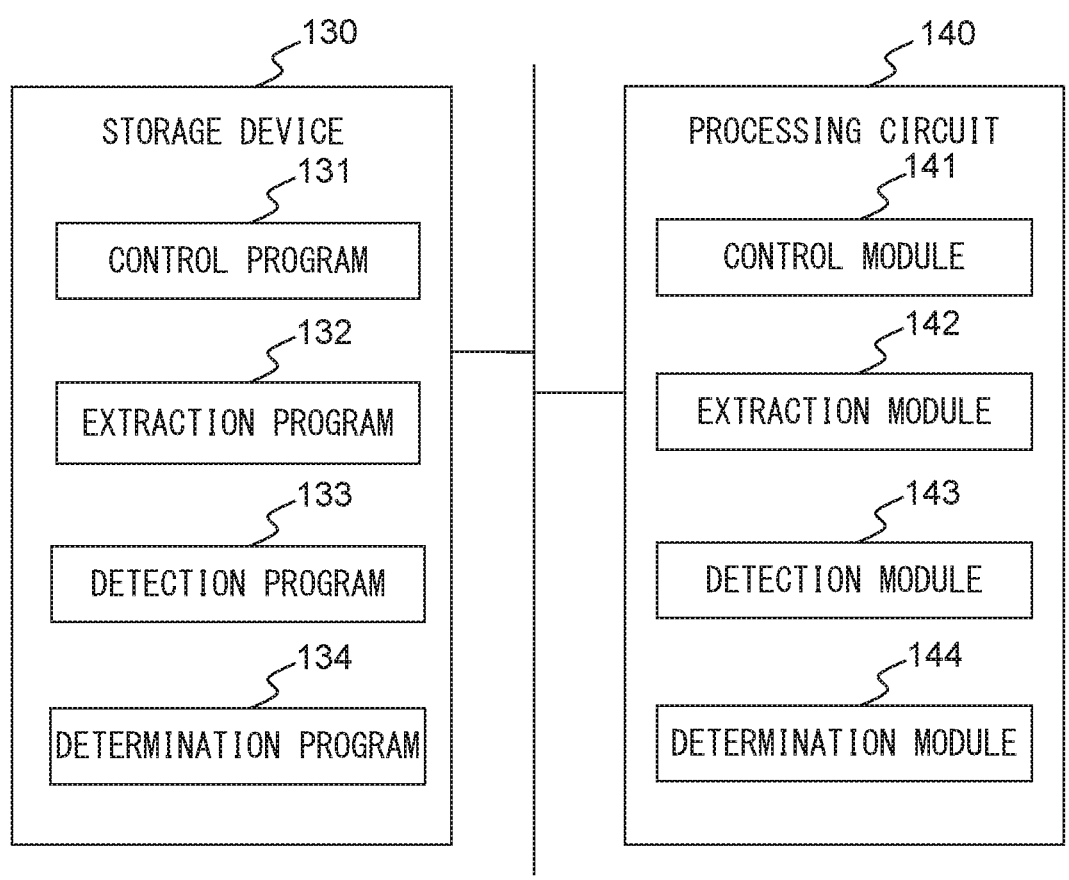
FIG. 4 is a diagram illustrating a schematic configuration of a storage device 130 and a processing circuit 140.

FIG. 4 is a diagram illustrating schematic configurations of the storage device 130 and the processing circuit 140.

As illustrated in FIG. 4, the storage device 130 stores a control program 131, an extraction program 132, a detection program 133, and a determination program 134, etc. Each of these programs is a functional module implemented by software operating on a processor. The processing circuit 140 reads each program stored in the storage device 130 and operates in accordance with each read program. Consequently, the processing circuit 140 functions as a control module 141, an extraction module 142, a detection module 143, and a determination module 144.

Figure 5:
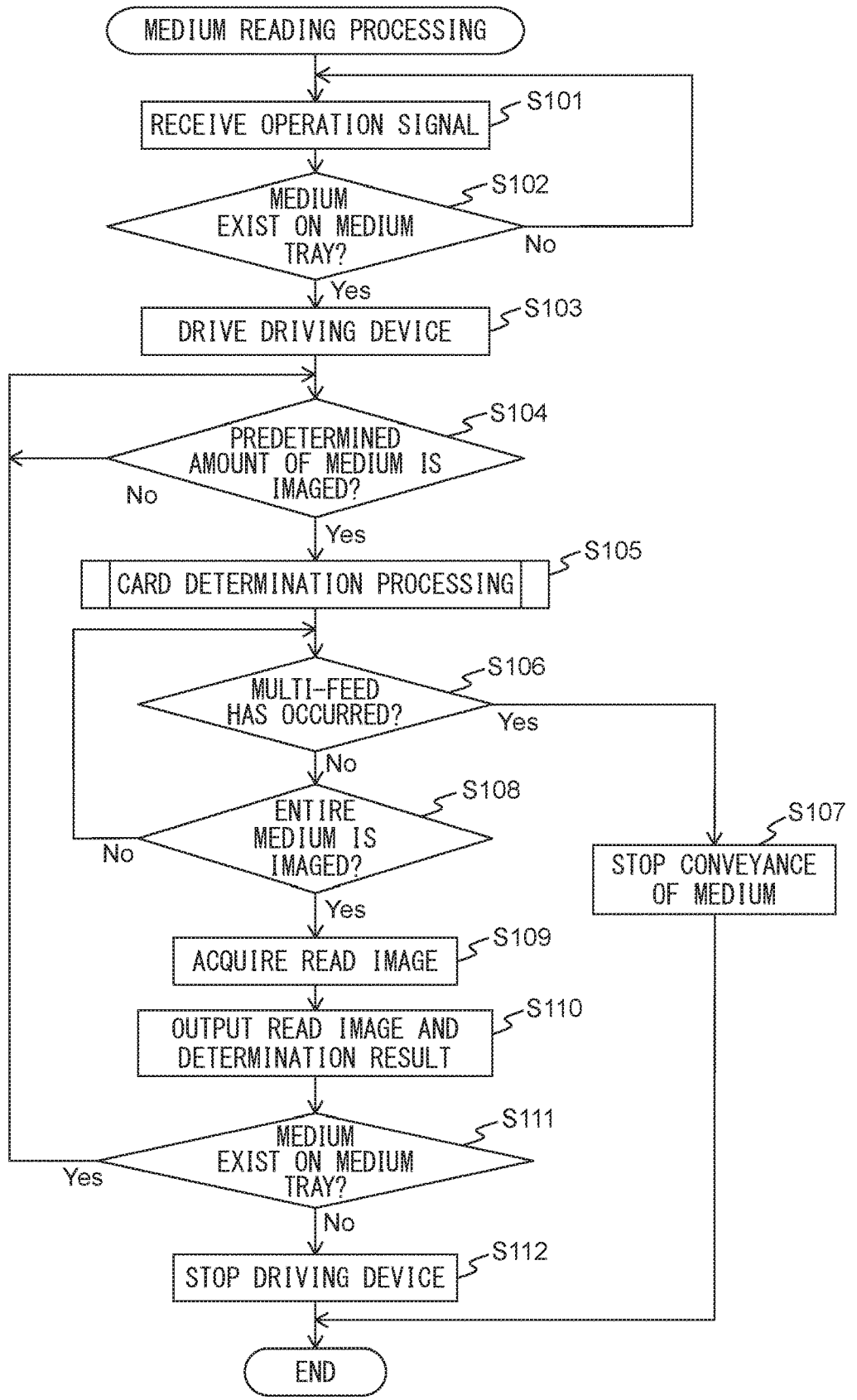
FIG. 5 is a flowchart illustrating an operation example of medium reading processing.

FIG. 5 is a flowchart illustrating an operation example of medium reading processing in the medium conveying apparatus 100.

Referring to the flowchart illustrated in FIG. 5, an operation example of the medium reading processing in the medium conveying apparatus 100 will be described below. The operation flow described below is executed mainly by the processing circuit 140 in cooperation with each element in the medium conveying apparatus 100, in accordance with a program previously stored in the storage device 130. The operation flow illustrated in FIG. 5 is periodically executed.

First, the control module 141 stands by until an instruction to read a medium is input by a user by use of the operation device 105, and an operation signal instructing to read the medium is received from the operation device 105 (step S101).

Next, the control module 141 determines whether or not a medium is placed on the medium tray 103, based on a first medium signal received from the first medium sensor 111 (step S102).

When a medium is not placed on the medium tray 103, the control module 141 returns the processing to step S101 and stands by until newly receiving an operation signal from the operation device 105.

On the other hand, when a medium is placed on the medium tray 103, the control module 161 drives the driving device 121, rotates the feed rollers 112, the brake rollers 113, and the first to fourth conveyance rollers 115, 116, 119, and 120, and feeds and conveys the medium (step S103).

Next, the control module 141 causes the imaging device 118 to start imaging the medium, and determines whether or not a predetermined amount of the medium has been imaged by the imaging device 118 (step S104). The predetermined amount is set to an amount sufficient to determine the roundness of the corner of the ID card. For example, the predetermined amount is set to an amount corresponding to the entire conveyed medium. The predetermined amount may be an amount that the entire roundness of the corners of at least the front edge of the ID card (end portion of the downstream side) is imaged.

The control module 141 acquires a second medium signal from the second medium sensor 117 and determines whether or not a medium exists at the position of the second medium sensor 117 based on the acquired second medium signal. When a signal value of the second medium signal changes from a value indicating nonexistence of a medium to a value indicating existence of a medium, the control module 141 determines that the front edge of the medium passes the position of the second medium sensor 117. Then, when a signal value of the second medium signal changes from the value indicating existence of a medium to the value indicating nonexistence of a medium, the control module 141 determines that the rear edge of the medium passes the position of the second medium sensor 117. The control module 141 determines that a predetermined amount of the medium has been imaged by the imaging device 118 when a predetermined period elapses after determining that the rear edge of the medium passes the position of the second medium sensor 117. The control module 141 may determine that a predetermined amount of the medium has been imaged by the imaging device 118 when the conveyance period corresponding to the predetermined amount has elapsed after determining that the rear edge of the medium passes the position of the second medium sensor 117.

Further, the control module 141 may determine whether or not a predetermined amount of the medium has been imaged by acquiring line images sequentially generated by the imaging device 118 and analyzing the acquired line images. In this case, the control module 141 determines whether or not the medium is included in the line image by using a known image processing technique, and when the control module 141 determines that the entire medium or a predetermined amount of the medium is included in the line image, the control module 141 determines that the predetermined amount of the medium has been imaged by the imaging device 118.

The control module 141 waits until a predetermined amount of the medium is imaged by the imaging device 118. When the imaging device 118 has imaged a predetermined amount of the medium, the processing circuit 140 executes a card determination processing (step S105). In the card determination processing, the processing circuit 140 determines whether or not the conveyed medium is an ID card. Details of the card determination processing will be described later.

Next, the control module 141 determines whether or not it has been determined in a multi-feed determination process (described later) that multi-feed of the medium has occurred (step S106).

When it is determined that multi-feed has occurred, the control module 141, as an abnormality process, stops the driving device 121, stops conveying the medium, and notifies the user that an abnormality has occurred, by using a speaker (not shown), LEDs, etc., (step S107). Then, the control module 141 ends the series of steps. The control module 141 may stop conveying the next medium after eject of the currently conveyed medium, instead of immediately stopping conveying the medium, as the abnormal processing.

On the other hand, when it is not determined that multi-feed has occurred, the control module 141 determines whether or not the entire conveyed medium has been imaged (step S108). For example, based on the second medium signal acquired from the second medium sensor 117, the control module 141 determines that the entire medium has been imaged when a predetermined period of time has elapsed after determining that the rear end of the medium has passed through the position of the second medium sensor 117. The control module 141 may determine that the entire conveyed medium has been imaged, when the control module 141 acquires a predetermined number of line images from the imaging device 118.

When the entire conveyed medium has not been imaged, the control module 141 returns the processing to step S106 and repeats the processing in step S106 to S108.

On the other hand, when the entire conveyed medium has been imaged, the control module 141 acquires a read image by combining all the acquired line images (step S109).

Next, the control module 141 outputs the read image and the result of the determination in the card determination process, i.e., the information indicating whether or not the medium included in the read image is the ID card, by transmitting the read image to an information processing apparatus (not shown) via the interface apparatus 122 (step S110). When receiving the read image and the result of the determination, the information processing apparatus classifies whether the read image corresponds to the ID card or another medium according to the received result of the determination, and stores each read image in a storage area such as a corresponding folder.

Next, the control module 141 determines whether or not a medium remains on the medium tray 103 based on a first medium signal acquired from the first medium sensor 111 (step S111). When a medium remains on the medium tray 103, the control module 171 returns the processing to step S104 and repeats the processing in steps S104 to S107.

On the other hand, when a medium does not remain on the medium tray 103, the control module 141 stops the driving device 121 (step S112) and ends the series of steps.

Figure 6:
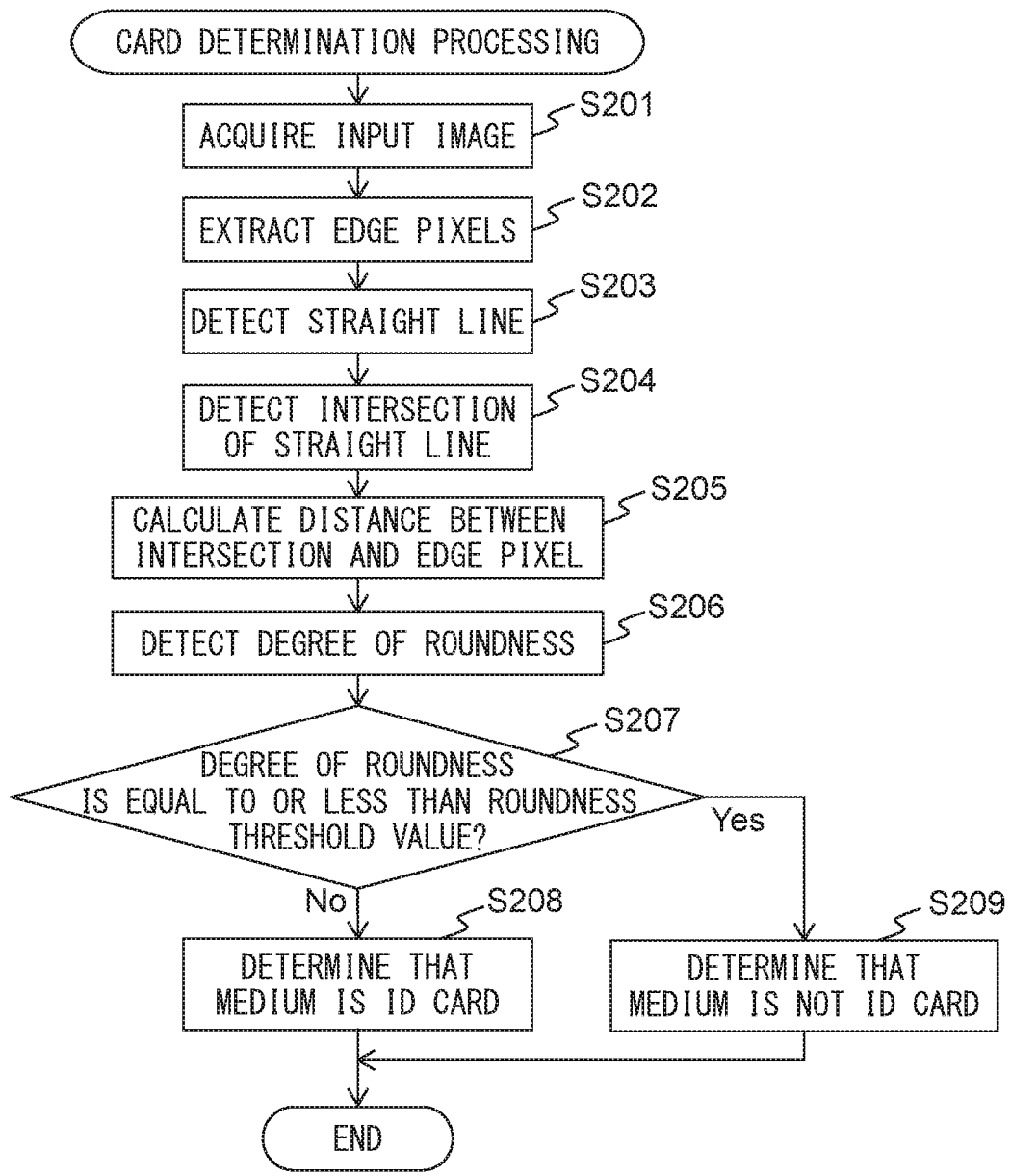
FIG. 6 is a flowchart illustrating an operation example of card determination processing.

FIG. 6 is a flowchart illustrating an operation example of the card determination processing.

The flow of operations shown in FIG. 6 is performed in step S105 of the flow chart shown in FIG. 5.

First, the control module 141 acquires the line image generated by the imaging device 118 up to the present time as the input image (step S201).

Next, the extraction module 142 extracts edge pixels from the input image (step S202). For each horizontal line (main scanning direction line) in the input image, the extraction module 142 calculates an absolute value (hereinafter referred to as an adjacent difference value) of a difference in gradation values between each pixel and a pixel adjacent to the right side of each pixel or a pixel separated by a predetermined distance from each pixel to the right side, in order from the left end of the input image. The gradation value is a luminance value or a color value. The extraction module 142 extracts the first (leftmost) pixel whose adjacent difference value is equal to or larger than the edge threshold value as the left edge pixel. The edge threshold value can be set, for example, to a difference (e.g., 20) of gradation values that a person can visually distinguish a difference in brightness on an image.

Similarly, for each horizontal line in the input image, the extraction module 142 calculates an adjacent difference value between each pixel and a pixel on the left side of each pixel, in order from the right end of the input image, and extracts the first pixel whose adjacent difference value is equal to or larger than the edge threshold value as the right edge pixel. For each horizontal line in the input image, the extraction module 142 may calculate an adjacent difference value between each pixel and a pixel on the right side of each pixel, in order from the left end of the input image, and extract the last pixel whose adjacent difference value is equal to or larger than the edge threshold value as the right edge pixel. Further, for each vertical line in the input image, the extraction module 142 calculates an adjacent difference value between each pixel and a pixel on the lower side of each pixel, in order from the upper end of the input image, and extracts the first pixel whose adjacent difference value is equal to or larger than the edge threshold value as the upper edge pixel. Further, for each vertical line in the input image, the extraction module 142 calculates an adjacent difference value between each pixel and a pixel on the upper side of each pixel, in order from the lower end of the input image, and extracts the first pixel whose adjacent difference value is equal to or larger than the edge threshold value as the lower edge pixel. For each vertical line in the input image, the extraction module 142 may calculate an adjacent difference value between each pixel and a pixel on the lower side of each pixel, in order from the upper end of the input image, and extract the last pixel whose adjacent difference value is equal to or larger than the edge threshold value as the lower edge pixel.

The extraction module 142 may calculate the absolute value of the difference between the gradation values of the two pixels separated by a predetermined distance or both adjacent pixels in the horizontal or vertical direction of each pixel as the adjacent difference value. Further, when the gradation value of a specific pixel is less than the threshold value and the gradation value of a pixel adjacent to the specific pixel or a pixel separated by a predetermined distance is equal to or larger than the threshold value, the extraction module 142 may extract the specific pixel as an edge pixel.

Next, the detection module 143 detects two straight lines substantially perpendicular to each other from the edge pixels extracted by the extraction module 142 (step S203). First the detection module 143 detects a straight line corresponding to the left side of the medium from the left edge pixel, detects a straight line corresponding to the right side of the medium from the right edge pixel, detects a straight line corresponding to the upper side of the medium from the upper edge pixel, detects a straight line corresponding to the lower side of the medium from the lower edge pixel. The detection module 143 detects a straight line using the least squares method. The detection module 143 may detect the straight line by using the Hough transform.

Further, the detection module 143 may detect a straight line, without using a specific left edge pixel and a specific right edge pixels among the left edge pixels and the right edge pixels, whose horizontal positions are separated from the horizontal position of a left edge pixel and a right edge pixel adjacent in the vertical direction by a predetermined distance or more from the specific left edge pixel and the specific right edge pixel. Similarly, the detection module 143 may detect a straight line without using a specific upper edge pixel and a specific lower edge pixels among the upper edge pixels and the lower edge pixels whose vertical positions are separated from the vertical positions of a upper edge pixels and a lower edge pixel adjacent in the horizontal direction by a predetermined distance or more from the specific upper edge pixel and the specific lower edge pixel. Thus, the detection module 143 can detect a straight line so as not to be affected by the upper and lower edges of the medium detected as the left edge pixel and the right edge pixel or the left and right edges of the medium detected as the upper edge pixel and the lower edge pixel when the medium is conveyed inclined.

Next, the detection module 143 extracts two straight lines substantially orthogonal to each other from the detected plurality of straight lines. First, the detection module 143 selects one straight line from the straight lines corresponding to the left side of the medium, and extracts a straight line substantially parallel (for example, within ±3°) to the selected straight line from the straight lines corresponding to the right side of the medium. Next, the detection module 143 extracts a straight line substantially orthogonal (for example, within ±3° with respect to 90°) to the straight line selected from the straight lines corresponding to the left side of the medium, from the straight lines corresponding to the upper side and the lower side of the medium, respectively. The detection module 143 extracts straight lines of a combination in which the area of the region surrounded by each straight line is the largest among the combinations of straight lines satisfying the above conditions. The detection module 143 detects straight lines corresponding to each of the extracted left and upper sides, straight lines corresponding to each of the upper and right sides, straight lines corresponding to each of the right and lower sides, and straight lines corresponding to each of the lower and left sides, respectively, as two straight lines substantially perpendicular to each other.

Next, the detection module 143 detects the intersection of detected two straight lines substantially perpendicular to each other (step S204).

Next, the detection module 143, for detected intersection, calculates the distances between each intersection and one or more predetermined edge pixel (step S205). The predetermined edge pixels are edge pixels located inside each intersection, i.e., on the center side of the area surrounded by the detected straight line from the detected intersection. Alternatively, the predetermined edge pixels are edge pixels located within a predetermined range from each intersection. Alternatively, the predetermined edge pixels are edge pixels from the first predetermined order to the second predetermined order in the order closest to each intersection among all edge pixels. The first predetermined order is set to the first or subsequent order. By setting the first predetermined order to the second or subsequent ranks, it is suppressed that the edge pixels detected by noise, etc., are extracted as the predetermined edge pixels. The second predetermined order is the order of the first predetermined order or subsequent order. That is, the detection module 143, for detected intersection, calculates the distances between each intersection and one or more predetermined edge pixels.

The detection module 143, as a distance between each intersection and each predetermined edge pixel, calculates a Euclidean distance between each intersection and each predetermined edge pixel. The detection module 143, as the distance between each intersection and each predetermined edge pixel, may calculate a Manhattan distance between each intersection and each predetermined edge pixel, i.e. the sum of the distance in the horizontal direction and the distance in the vertical direction. Thus, the detection module 143 can efficiently and accurately calculate the distance between each intersection and each predetermined edge pixel. Further, the detection module 143, as the distance between each intersection and each predetermined edge pixel, may calculate a Chebyshev distance between each intersection and each predetermined edge pixel, i.e., the larger distance among the distance in the horizontal direction and the distance in the vertical direction. Thus, the detection module 143 can efficiently calculate the distance between each intersection and each predetermined edge pixel.

Figure 7A:
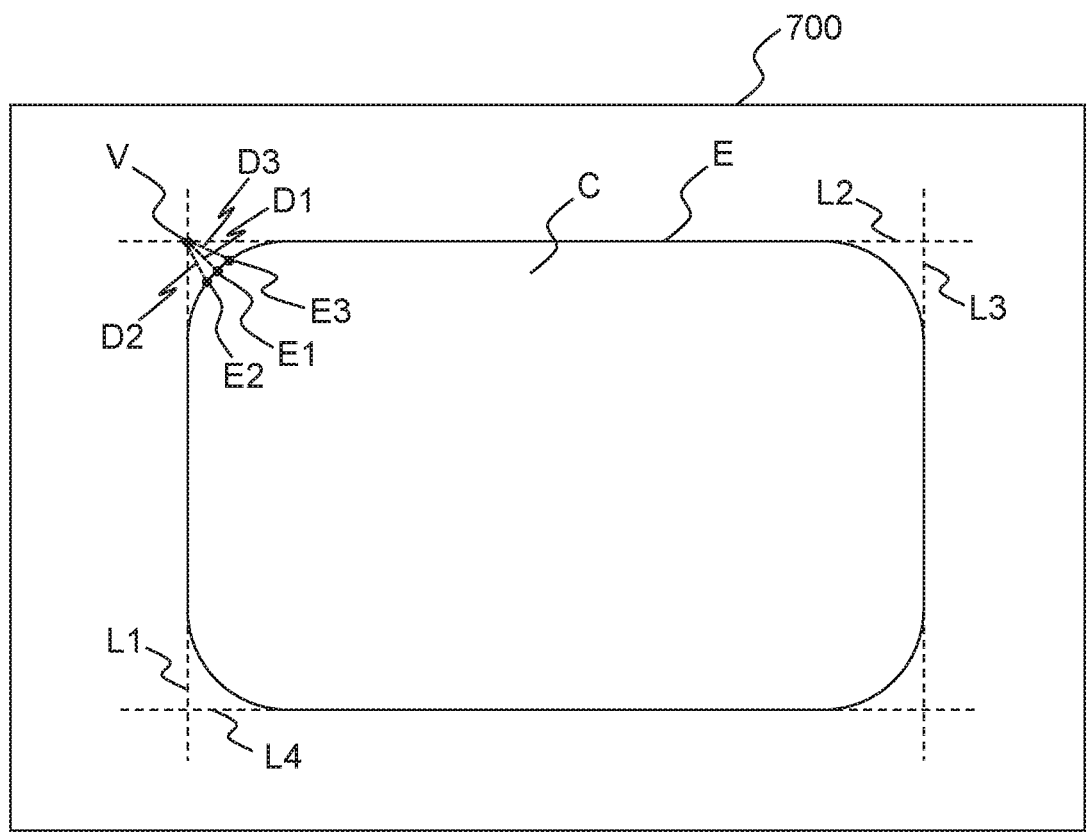
FIG. 7A is a schematic diagram for illustrating a distance between each intersection and an edge pixel.

FIG. 7A is a schematic diagram for illustrating the distance between each intersections and each predetermined edge pixel.

The FIG. 7A shows an input image 700 in which the ID card C is imaged. In the example shown in FIG. 7A, the edge pixel E is extracted from the outer peripheral portion of the ID-card C, a straight line L1 corresponding to the left side, a straight line L2 corresponding to the upper side, a straight line L3 corresponding to the right side and a straight line L4 corresponding to the lower side is detected from each edge pixel E. Further, the first edge pixels E1, the second edge pixels E2, and the third edge pixels E3 in the order closer from the intersection point V of the straight line L1 and the straight line L2 are extracted as predetermined edge pixels, and each distance D1 to D3 from the intersection point V to each edge pixel E1 to E3 is calculated.

As shown in FIG. 7A, since each corner of the ID card has a certain degree of roundness, distances between each intersection point V and predetermined edge pixels E1 to E3 in the input image 700 acquired by imaging the ID card have a certain degree of size. On the other hand, since each angle of the ordinary paper such as PPC paper has a right angle, the distance between each intersection point and a predetermined edge pixel is close to 0 in the input image acquired by imaging the ordinary paper. Therefore, the detection module 143 can accurately detect the degree of roundness at the corner of the medium included in the input image based on the distance between each intersection and each predetermined edge pixel.

Next, the detection module 143 detects, for detected intersection point, the degree of roundness at the corner of the medium in the input image based on the distance between each intersection and each predetermined edge pixel (step S206). For example, the detection module 143 calculates, for detected intersection, a statistical value (average value, median value, mode value, maximum value or minimum value, etc.) of each distance between each intersection and each predetermined edge pixel. The degree of roundness is a degree close to the ideal value of roundness at the corner of the ID card, and the detection module 143 calculates the degree of roundness so that the calculated statistical value becomes higher as it is close to the ideal value of the ID card. For example, the detection module 143 calculates the inverse of the difference between the calculated statistical value and the ideal value, or a value acquired by subtracting the difference from the upper limit value, as the degree of roundness.

The ideal value of the roundness at the corner of the ID card is set based on, for example, the size of the ID card defined by ISO/IEC7810. In ISO/IEC7810 or its additional provisions (ISO/IEC7813, etc.), the radius (R) of roundness of the corner of the ID-card is specified at 3.18 mm. Thus, when the conveyed medium is an ID card, the ideal distance between each intersection and each predetermined edge pixel is set to $(2^{1/2}-1) \times 3.18$ [mm]. The detection module 143 may set the degree of roundness to 1 when the difference between the statistical value and the ideal value is equal to or less than the predetermined threshold value, and may set the degree of roundness to 0 when the difference between the statistical value and the ideal value is larger than the predetermined threshold value. The detection module 143 may set the degree of roundness to 1 when the statistical value is equal to or more than the ideal value, and may set the degree of roundness to 0 when the statistical value is less than the ideal value.

The detection module 143 may calculate the degree of roundness based on the degree of change of the Manhattan distance between each intersection and a plurality of edge pixels located within a predetermined range from each intersection.

Figure 7B:
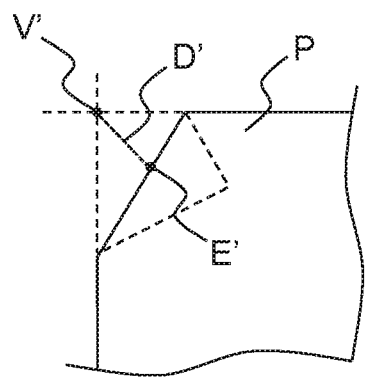
FIG. 7B is a schematic diagram for illustrating a sheet P on which corner folding has occurred.
Figure 7C:
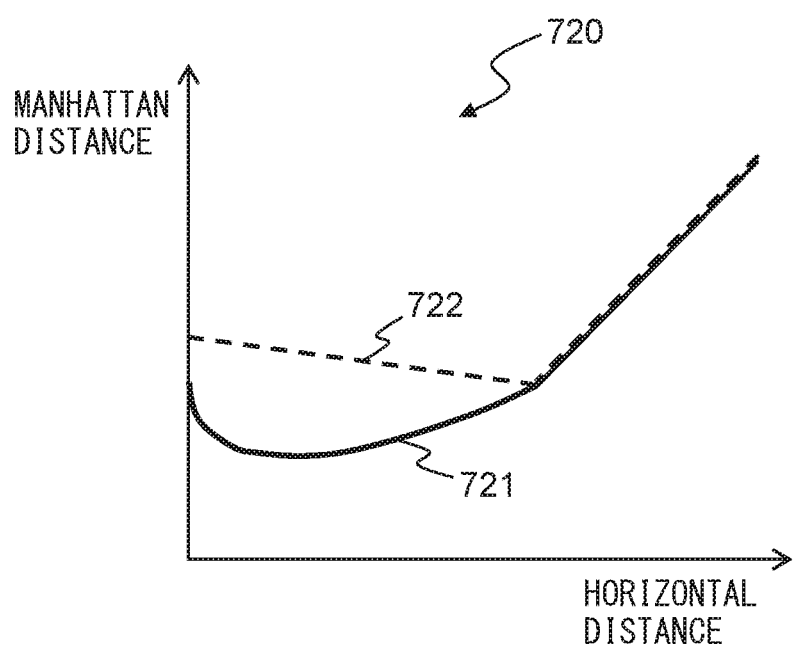
FIG. 7C is a schematic diagram for illustrating a sheet P on which corner folding has occurred.

FIG. 7B and FIG. 7C are schematic diagrams for illustrating a sheet P in which corner folding (corner bending) has occurred.

FIG. 7B shows a part of an input image acquired by imaging an input image of a sheet P on which corner bending has occurred. As shown in FIG. 7B, since the distance D' between the intersection point V' detected from the outer shape of the paper P and the predetermined edge pixel E' has a certain degree of magnitude in the paper P in which corner bending has occurred, there is a possibility that the distance D' becomes close to an ideal value. However, since the corners of the paper are usually bent in a straight line, the Manhattan distance (the sum of the distance in the horizontal direction and the distance in the vertical direction) between the intersection and a plurality of predetermined edge pixels changes linearly. Further, when the shape of the folded portion is isosceles triangle, the Manhattan distance between the intersection and a plurality of predetermined edge pixels does not change.

FIG. 7C shows graph 720 showing the change of Manhattan distance between the intersection and each edge pixel. The horizontal axis of graph 720 shows the distance in the horizontal direction from the intersection, and the vertical axis of graph 720 shows the Manhattan distance from the intersection. Graph 721 shows the distribution of the Manhattan distances for each of the edge pixels located within a predetermined range from the intersection point V in the ID card C shown in FIG. 7A. Graph 722 shows the distribution of the Manhattan distances for each of the edge pixels located within a predetermined range from the intersection point V in the paper P shown in FIG. 7B. As shown in FIG. 7C, in an ID card C with some roundness in the corners, the Manhattan distance between the intersection and each edge pixel varies to draw a gentle curve with respect to the change of the distance in the horizontal direction. On the other hand, in the paper P in which the corner folding occurs, the Manhattan distance between the intersection point and each edge pixel varies linearly with respect to the change of the distance in the horizontal direction.

First, the detection module 143 extracts a pair of two edge pixels adjacent to each other in a predetermined direction (horizontal or vertical direction) among a plurality of edge pixels located within a predetermined range from the intersection. The detection module 143 calculates, for extracted pair, the first degree of change of the distance which is a degree of change of the Manhattan distance between the intersection point and each edge pixel. The detection module 143, as the first degree of change of the distance, calculates the absolute value of the ratio (slope) of the change amount of the Manhattan distance to the change amount of the distance in the horizontal direction between the intersection and each edge pixel.

Next, the detection module 143 extracts two sets of pairs of the extracted two edge pixels adjacent to each other in a predetermined direction among the pairs of the extracted two edge pixels. The detection module 143, for extracted pair, calculates a second degree of change of the distance which is a degree of change of the first degree of change of the distance. The detection module 143, as the second degree of change of the distance, calculates the absolute value of the ratio of the change amount of the first degree of change of the distance, with respect to the change amount of the distance in the horizontal direction between the intersection and each edge pixel (used when calculating the first degree of change of the distance). The second degree of change of the distance calculated in this way corresponds to a value (second order derivative value) acquired by second order derivative of the Manhattan distance between each intersection and each edge pixel with respect to the distance in the horizontal direction between each intersection and each edge pixel. The detection module 143 may calculate the absolute value of the change amount of the first degree of change of the distance as the second degree of change of the distance.

The detection module 143 calculates a statistical value (average value, median value, mode value, maximum value or minimum value, etc.) of the second order derivative value calculated for each pair. The detection module 143 corrects the degree of roundness so that the degree of roundness becomes larger as the calculated statistical value becomes larger, and the degree of roundness becomes smaller as the calculated statistical value becomes smaller. The detection module 143 may use the calculated statistical value as it is as the degree of roundness.

By calculating the degree of roundness based on the degree of change of the Manhattan distance between each intersection and a plurality of edge pixels located within a predetermined range from each intersection, the medium conveying device 100 can suppress the sheet on which the corner folding has occurred from being erroneously determined as an ID card.

As described above, the detection module 143 detects the degree of roundness at the corner of the medium in the input image based on the edge pixels extracted by the extraction module 142.

Next, the determination module 144 determines whether or not the degree of roundness detected by the detection module 143 is equal to or less than the roundness threshold value (step S207). The roundness threshold value is set to a value between the degree of roundness calculated for the ID card and the degree of roundness calculated for the paper by a prior experiment.

When the degree of roundness is larger than the roundness threshold value, the determination module 144 determines that the conveyed medium is an ID card (step S208), and ends a series of steps. On the other hand, when the degree of roundness is equal to or less than the roundness threshold value, the determination module 144 determines that the conveyed medium is not an ID card (step S209), and ends a series of steps. The determination module 144 determines that the medium is an ID card when all degree of roundness detected for each intersection (corner) is larger than the roundness threshold value, and determines that the medium is not an ID card when at least one degree of roundness detected for each intersection is equal to or less than the roundness threshold value. The determination module 144 may determine that the medium is an ID card when the degree of roundness of a predetermined number (e.g., 1) or more is larger than the roundness threshold value, otherwise the determination module 144 may determine that the medium is not an ID card. For example, by setting the predetermined number to two or more, the determination module 144 can suppress erroneous determination of a sheet in which a corner bend occurs in only one corner as an ID card. In this manner, the determination module 144 determines whether or not the conveyed medium is an ID card based on the degree of roundness.

Instead of calculating the degree of roundness for all the corners of the medium, the detection module 143 may calculate the degree of roundness for at least one corner. In this case, in S104 of FIG. 5, the control module 141 acquires the input image from the imaging device 118 so that the input image includes a medium having an amount which a straight line corresponding to the upper side of the medium and at least one of a straight line corresponding to the right side of the medium or a straight line corresponding to the left side of the medium can be detected. The detection module 143 detects only two straight lines substantially perpendicular to each other in the step S203, and detects only the intersection of the two straight lines in the step S204. In this case, although the determination accuracy of whether or not the medium is an ID card is reduced, the medium conveying apparatus 100 can shorten the processing time of the card determination processing and determine whether or not the medium is an ID card at an early stage.

FIG. 8 is a flowchart illustrating an operation example of the multi-feed determination processing.

Referring to the flowchart illustrated in FIG. 8, an operation example of the multi-feed determination process in the medium conveying apparatus 100 will be described below. The operation flow described below is executed mainly by the processing circuit 140 in cooperation with each element in the medium transport apparatus 100 in accordance with a program previously stored in the storage device 130. The flowchart illustrated in FIG. 8 is periodically executed, after the control module 141 starts conveying the medium in the step S103 of FIG. 5.

First, the control module 141 acquires an ultrasonic signal from the ultrasonic sensor 114 (step S301).

Next, the control module 141 determines whether or not the type of the medium has been determined in the card determination process (step S302).

When the type of the medium has not been determined, the controller 141 stores the signal values of the acquired ultrasonic signals in the storage device 130 (step S303), and ends a series of steps.

On the other hand, when the type of the medium has been determined, the control module 141 determines whether or not it is determined that the medium is an ID card in the card determination process (step S304).

When it is determined that the medium is an ID card, the control module 141 stops determining whether or not multi-feed has occurred (step S305), and ends a series of steps.

On the other hand, when it is determined that the medium is not the ID card, the control module 141 determines whether or not each signal value of the ultrasonic signal acquired so far is less than the multi-feed threshold value (step S306).

Figure 9:
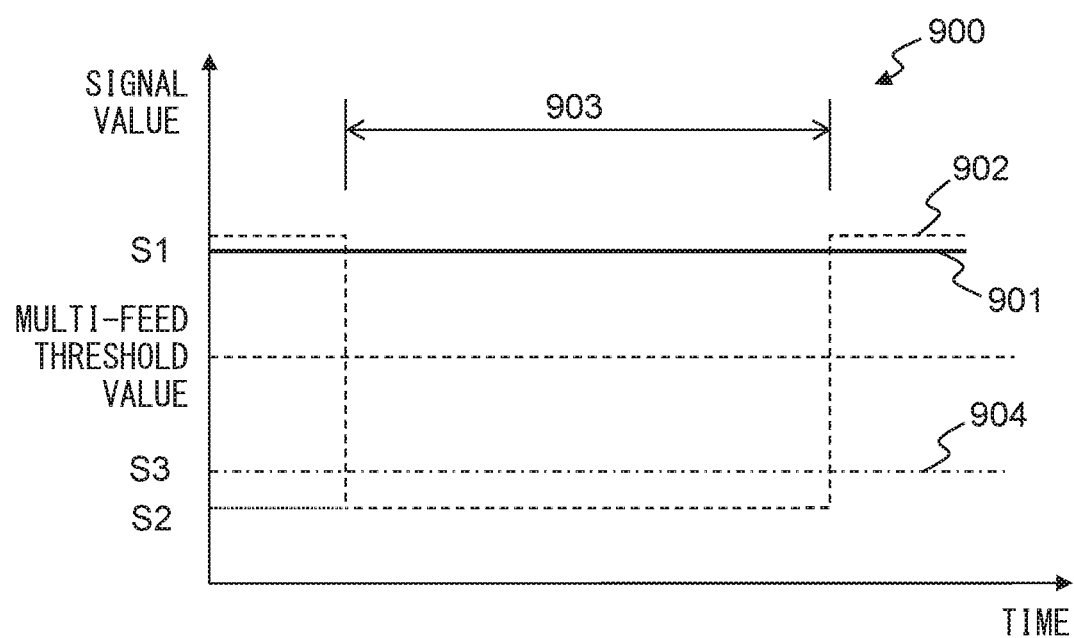
FIG. 9 is a schematic diagram for illustrating a characteristic of an ultrasonic signal.

FIG. 9 is a schematic diagram for illustrating a characteristic of an ultrasonic signal.

In a graph 900 in FIG. 9, a solid line 901 represents a characteristic of an ultrasonic signal when one sheet of paper is conveyed as a medium, and a dotted line 902 represents a characteristic of an ultrasonic signal when multi-feed of paper is occurring. The horizontal axis of graph 900 indicates time, and the vertical axis indicates a signal value of the ultrasound signal. Due to occurrence of multi-feed, a signal value of the ultrasonic signal in the dotted line 902 declines in a section 903. The multi-feed threshold value is set to a value between a signal value S1 of the ultrasonic signal when one sheet of paper is conveyed and a signal value S2 of the ultrasonic signal when multi-feed of paper is occurring. By determining whether or not a signal value of the ultrasonic signal is less than the multi-feed threshold value, the control module 141 can determine whether or not the multi-feed of the medium is occurring.

On the other hand, the one-dot chain line 904 represents a characteristics of the ultrasonic signal when only one plastic ID card is conveyed. When an ID card is conveyed, since a signal value of the ultrasonic signal becomes less than the multi-feed threshold value, the control module 141 erroneously determines that multi-feed of the medium has occurred. In particular, a signal value of the ultrasonic signal when the multi-feed of thin paper is occurring is close to a signal value of the ultrasonic signal when an ID card is conveyed, and it is difficult to set the multi-feed threshold value to a value between the two signal values. However, when it is determined that the medium is an ID card, the control module 141 stops detecting the multi-feed, and thus can prevent the detection error of the multi-feed of the medium.

The control module 141 determines that the multi-feed has occurred when any of signal values of the ultrasonic signal acquired so far is less than the multi-feed threshold value (step S307), and ends series of steps. In this case, the control module 141 determines that multi-feed of the medium has occurred in the step S106 of FIG. 5, and controls the conveying roller so as to stop conveying the medium in the step S107. On the other hand, the control module 141 determines that the multi-feed has not occurred when all of the signal values of the ultrasonic signal acquired so far is equal to or more than the multi-feed threshold value (step S308), and ends series of steps. Thus, the control module 141 determines whether or not multi-feed of the medium has occurred by comparing the ultrasonic signal with the multi-feed threshold value.

Further, the control module 141 stops determining whether or not multi-feed has occurred, according to whether or not the conveyed medium is an ID card. That is, the control module 141 controls the conveying roller based on the result of the determination by the determination module 144.

The control module 141 may control the conveying roller so that the conveying speed of the medium (the motor rotation speed of the driving device 121) is different according to the result of the determination by the determination module 144. In this case, the control module 141 controls the conveying speed in the case where the conveyed medium is an ID card to be lower (decelerate) than the conveying speed in the case where the conveyed medium is not an ID card, so that the slippery plastic ID card is conveyed more stably.

Further, either the control of the conveying roller based on the result of the determination by the determination module 144 or the output of the result of the determination may be omitted.

As described in detail above, the medium conveying apparatus 100 detects the degree of roundness at the corner of the medium based on the edge pixels in the input image, and determines whether or not the medium is an ID card based on the detected degree of roundness. As a result, the medium conveying apparatus 100 can more suitably determine whether or not the conveyed medium is an ID card.

In particular, since the medium conveying apparatus 100 detects the degree of roundness based on the distances between the intersection of the straight line corresponding to the outer shape of the medium and the predetermined edge pixels, even when the medium is conveyed inclined manner, the medium conveying apparatus 100 can properly detect the degree of roundness. Therefore, even when the medium is conveyed in an inclined manner, the medium conveying apparatus 100 can properly determine whether or not the medium is an ID card. Further, the medium conveying device 100 can efficiently detect the degree of roundness with a low calculation amount by detecting the degree of roundness based on the distances between the intersection of the straight line corresponding to the outer shape of the medium and the predetermined edge pixels, thereby the medium conveying device 100 can reduce the processing load of the card determination process.

Further, since the user does not need to set the multi-feed detection function to OFF in order to prevent the occurrence of the multi-feed of the medium from being erroneously detected when the medium conveying apparatus 100 conveys a card, the medium conveying apparatus 100 can improve the convenience of the user.

Further, since the medium conveying device 100 can determine whether or not the medium is an ID card without using a special sensor such as a thickness sensor, it is possible to suppress an increase in the apparatus cost.

Figure 10:
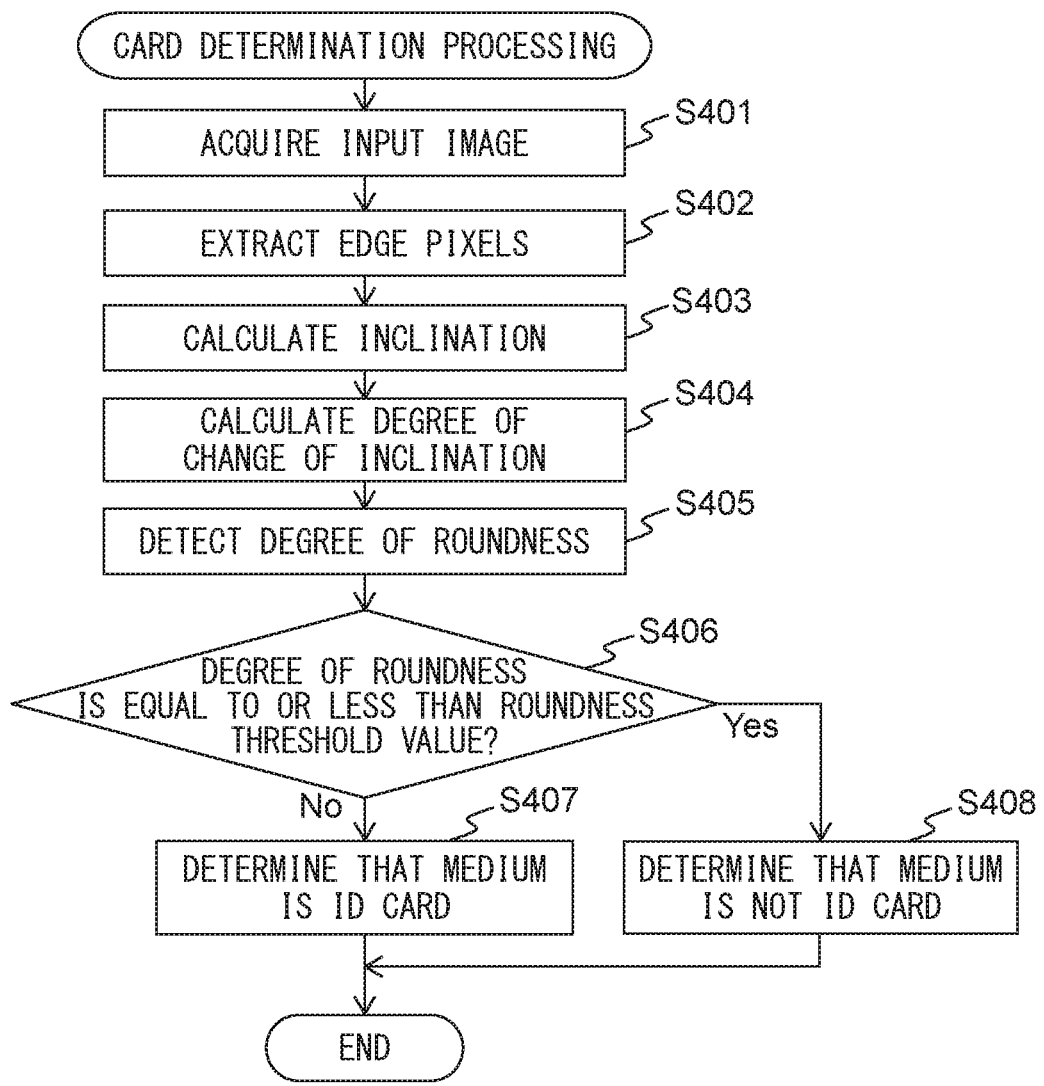
FIG. 10 is a flowchart illustrating another operation example of card determination processing.

FIG. 10 is a flowchart illustrating an operation example of card determination processing according to another embodiment.

The card determination processing shown in FIG. 10 is executed instead of the card determination processing shown in FIG. 6. Since the processing of steps S401 to S402, S406 to S408 in FIG. 10 is similar to the processing of steps S201 to S202, S207 to S209 in FIG. 6, detailed descriptions thereof will be omitted, and only the processing of steps S403 to S405 will be described below.

The detection module 143 extracts, for each of the upper edge pixels, the lower edge pixels, the left edge pixels, and the right edge pixels extracted by the extraction module 142, a pair of two edge pixels adjacent to each other among each edge pixel. The detection module 143 calculates, for extracted pair, the inclination of the straight line passing through the two edge pixels (step S403). That is, the detection module 143 calculates the absolute value of the ratio of the change amount of the position in the direction (vertical or horizontal direction) perpendicular to a predetermined direction (horizontal or vertical direction) of the two edge pixels with respect to the change amount of the position in the predetermined direction.

Next, the detection module 143 extracts two pairs adjacent to each other among the extracted pairs of the two edge pixels. The detection module 143 calculates, for each of the extracted pairs, a degree of change of the inclination, which is a degree of change of each calculated inclination (step S404). The detection module 143 calculates the absolute value of the ratio of the change amount of the inclination with respect to the change amount at the position in a predetermined direction (horizontal or vertical direction) of the two edge pixels (used when calculating the inclination) as the degree of change of the inclination. The degree of change of the inclination calculated in this way corresponds to a value (second order derivative value) acquired by second order derivative of the position in the predetermined direction of each edge pixel with respect to a direction perpendicular to the predetermined direction. The detection module 143 may calculate the absolute value of the change amount of the inclination as the degree of change of the inclination.

FIGS. 11A, 11B, 11C, and 11D are schematic diagrams for illustrating the degree of change of the inclination of each edge pixel.

Figure 11A:
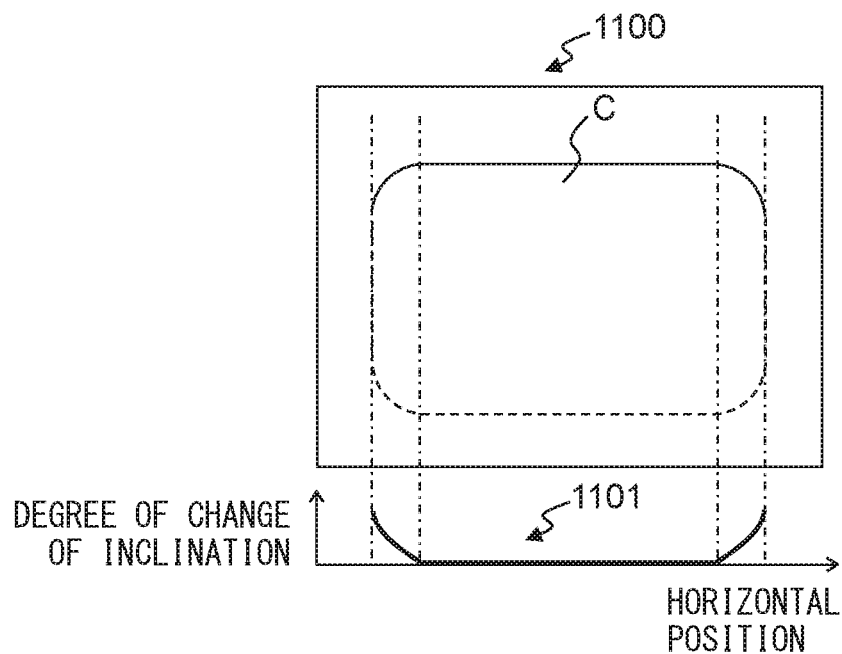
FIG. 11A is a schematic diagram for illustrating a second order derivative value of each edge pixel.

An image 1100 in FIG. 11A is an input image acquired by imaging an ID card C conveyed straight. In the input image 1100, the upper edge pixels are indicated by a solid line, the other edge pixels are indicated by a dotted line. A graph 1101 in FIG. 11A is a graph showing the degree of change of the inclination of each upper edge pixel extracted from the input image 1100. The horizontal axis of graph 1101 indicates the position in the horizontal direction in the input image, and the vertical axis of graph 1101 indicates the degree of change of the inclination of each upper edge pixel at each position. As shown in the input image 1100, in an ID card having a rounded corner, the inclination of the upper edge pixel group changes nonlinearly with respect to the change of the position in the horizontal direction in the portion corresponding to the roundness. Therefore, as shown in the graph 1101, the ratio of the change amount of the inclination to the change amount of the position in the horizontal direction has a certain magnitude in the portion corresponding to the roundness. On the other hand, although not shown, in the paper in which the angle is right angle, the inclination of the upper edge pixel group does not change with respect to the change of the position in the horizontal direction.

Figure 11B:
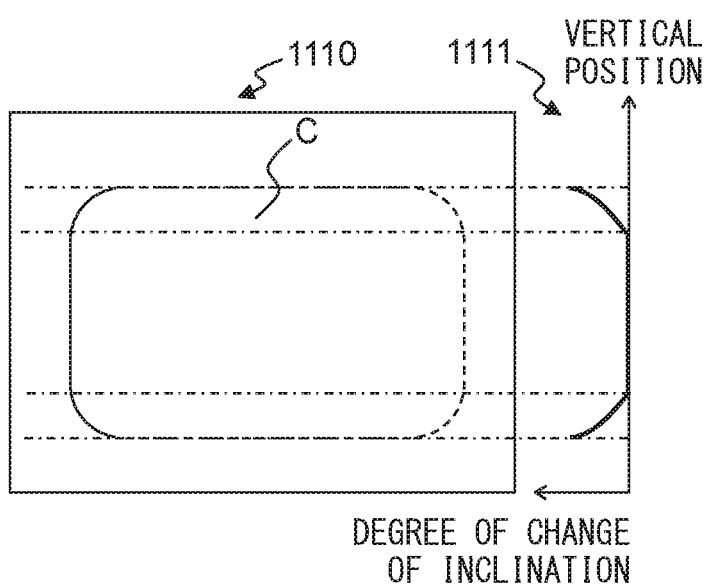
FIG. 11B is a schematic diagram for illustrating a second order derivative value of each edge pixel.

The image 1110 in FIG. 11B is an input image acquired by imaging an ID card C conveyed straight. In the input image 1110, the left edge pixels are indicated by a solid line, the other edge pixels are indicated by a dotted line. A graph 1111 in FIG. 11B is a graph showing the degree of change of the inclination of each left edge pixel extracted from the input image 1110. The vertical axis of graph 1111 indicates the position in the vertical direction in the input image, and the horizontal axis of graph 1111 indicates the degree of change of the inclination of each left edge pixel at each position. As shown in the input image 1110, in the ID card having a rounded corner, the inclination of the left edge pixel group changes nonlinearly with respect to the change of the position in the vertical direction in the portion corresponding to the roundness. Therefore, as shown in graph 1111, the ratio of the change amount of the inclination to the change amount of the position in the vertical direction has a certain magnitude in the portion corresponding to the roundness. On the other hand, although not shown, in the paper in which the angle is right angle, the inclination of the left edge pixel group does not change with respect to the change of the position in the vertical direction.

Figure 11C:
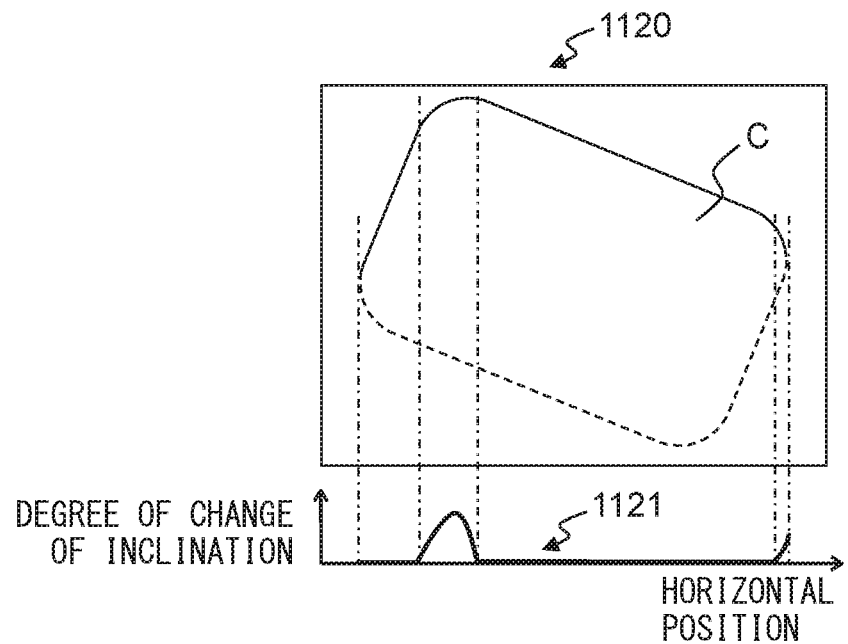
FIG. 11C is a schematic diagram for illustrating a second order derivative value of each edge pixel.

An image 1120 in FIG. 11C shows an input image acquired by imaging an ID card C conveyed in an inclined manner. In the input image 1120, the upper edge pixels are indicated by a solid line, the other edge pixels are indicated by a dotted line. The graph 1121 of FIG. 11C is a graph showing the degree of change of the inclination of each upper edge pixel extracted from the input image 1120. The horizontal axis of graph 1121 indicates the position in the horizontal direction in the input image, and the vertical axis of graph 1121 indicates the degree of change of the inclination of each upper edge pixel at each position. As shown in the input image 1120, as in the case where the ID card C is conveyed straight, in the ID card having the roundness at the corner, the inclination of the upper edge pixel group changes nonlinearly with respect to the change of the position in the horizontal direction in the portion corresponding to the roundness. Therefore, as shown in the graph 1121, the ratio of the change amount of the inclination to the change amount of the position in the horizontal direction has a certain magnitude, in the portion corresponding to the roundness. On the other hand, although not shown, in the paper in which the angle is right angle, the inclination of the upper edge pixel group does not change with respect to the change of the position in the horizontal direction except at one point corresponding to the angle.

Figure 11D:
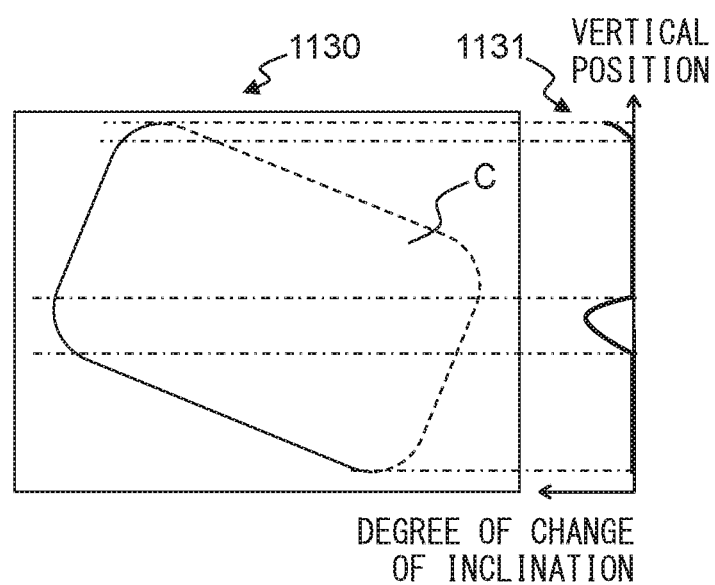
FIG. 11D is a schematic diagram for illustrating a second order derivative value of each edge pixel.

The image 1130 of FIG. 11D shows an input image acquired by imaging an ID card C conveyed in an inclined manner. In the input image 1130, the left edge pixels are indicated by a solid line, the other edge pixels are indicated by a dotted line. The graph 1131 of FIG. 11D is a graph showing the degree of change of the inclination of each left edge pixel extracted from the input image 1130. The vertical axis of graph 1131 indicates the position in the vertical direction in the input image, and the horizontal axis of graph 1131 indicates the degree of change of the inclination of each left edge pixel at each position. As shown in the input image 1130, as in the case where the ID card C is conveyed straight, in the ID card having the roundness at the corner, the inclination of the left edge pixel group changes nonlinearly with respect to the change of the position in the vertical direction in the portion corresponding to the roundness. Therefore, as shown in graph 1131, the ratio of the change amount of the inclination to the change amount of the position in the vertical direction has a certain magnitude in the portion corresponding to the roundness. On the other hand, although not shown, in the paper in which the angle is right angle, the inclination of the left edge pixel group does not change with respect to the change of the position in the vertical direction except at one point corresponding to the angle.

Therefore, the detection module 143 can accurately detect the degree of roundness at the corner of the medium included in the input image based on the degree of change of the inclination of each edge pixel.

Next, the detection module 143 detects, for each of the upper edge pixels, the lower edge pixels, the left edge pixels, and the right edge pixels, the degree of roundness at the corner of the medium in the input image based on the degree of change of the inclination of each edge pixel (step S405). For example, the detection module 143 extracts, for each of the upper edge pixels, the lower edge pixels, the left edge pixels, and the right edge pixels, the edge pixels from the first predetermined order to the second predetermined order in the order in which the degree of change of the inclination is large. The first predetermined order is the order of the second or subsequent order. By setting the first predetermined order to the second or subsequent order, the influence of the degree of change of the inclination calculated from one point corresponding to the corner of the sheet is removed. The second predetermined order is the order of the first predetermined order or subsequent order. The detection module 143 calculates, for each of the upper edge pixel, the lower edge pixel, the left edge pixel, and the right edge pixel, a statistical value (average value, median value, mode value, maximum value or minimum value, etc.) of the degree of change of the inclination of each extracted edge pixel. The detection module 143 may calculate the number of edge pixels whose degree of change of the inclination is larger than a predetermined threshold value, as a statistical value of the degree of change of the inclination of each edge pixel.

The degree of roundness is a value indicating a degree close to the ideal value of the roundness at the corner of the ID card, and the detection module 143 calculates the degree of roundness so that the degree of roundness becomes higher as the calculated statistical value is close to the ideal value of the ID card. For example, the detection module 143 calculates the inverse of the difference between the calculated statistical value and the ideal value, or a value acquired by subtracting the difference from the upper limit value, as the degree of roundness.

The ideal value in the ID card is set to the value of the statistical value calculated for the ID card specified in ISO/IEC7810 by prior experiments. The detection module 143 may set the degree of roundness to 1 when the difference between the statistical value and the ideal value is equal to or less than the predetermined threshold value, and may set the degree of roundness to 0 when the difference between the statistical value and the ideal value is larger than the predetermined threshold value. The detection module 143 may set the degree of roundness to 1 when the statistical value is equal to or larger than the ideal value, and may set the degree of roundness to 0 when the statistical value is less than the ideal value.

Instead of calculating the degree of roundness for all types of edge pixels of the upper edge pixel, the lower edge pixel, the left edge pixel and the right edge pixel, the detection module 143 may calculate the degree of roundness only for at least one type of edge pixels. In that case, in the step S104 of FIG. 5, the control module 141 acquires an input image from the imaging device 118 so that the input image includes a medium having an amount which at least the upper edge pixels can be detected. The detection module 143 detects only the upper edge pixel in the step S402, calculates only the degree of change of the inclination related to the upper edge pixel in the step S403 and S404, and detects the degree of roundness only for the upper edge pixel in the step S405. In this case, although the determination accuracy of whether or not the medium is the ID card is reduced, the medium conveying apparatus 100 can shorten the processing time of the card determination processing and determine whether or not the medium is the ID card at an early stage.

As described in detail above, the medium conveying device 100 can more suitably determine whether or not the conveyed medium is an ID card even when the medium conveying device 100 detects the degree of roundness at the angle of the medium based on the degree of change of the inclination of each edge pixel.

In particular, since the medium conveying device 100 detects the degree of roundness based on the degree of change of the inclination of each edge pixel, even when the medium is conveyed inclined manner, the medium conveying device 100 can suitably detect the degree of roundness and suitably determine whether or not the medium is an ID card. Further, the medium conveying device 100 can efficiently detect the degree of roundness with a low calculation amount by detecting the degree of roundness based on the degree of change of the inclination of each edge pixel, thereby the medium conveying device 100 can reduce the processing load of the card determination process.

Figure 12:
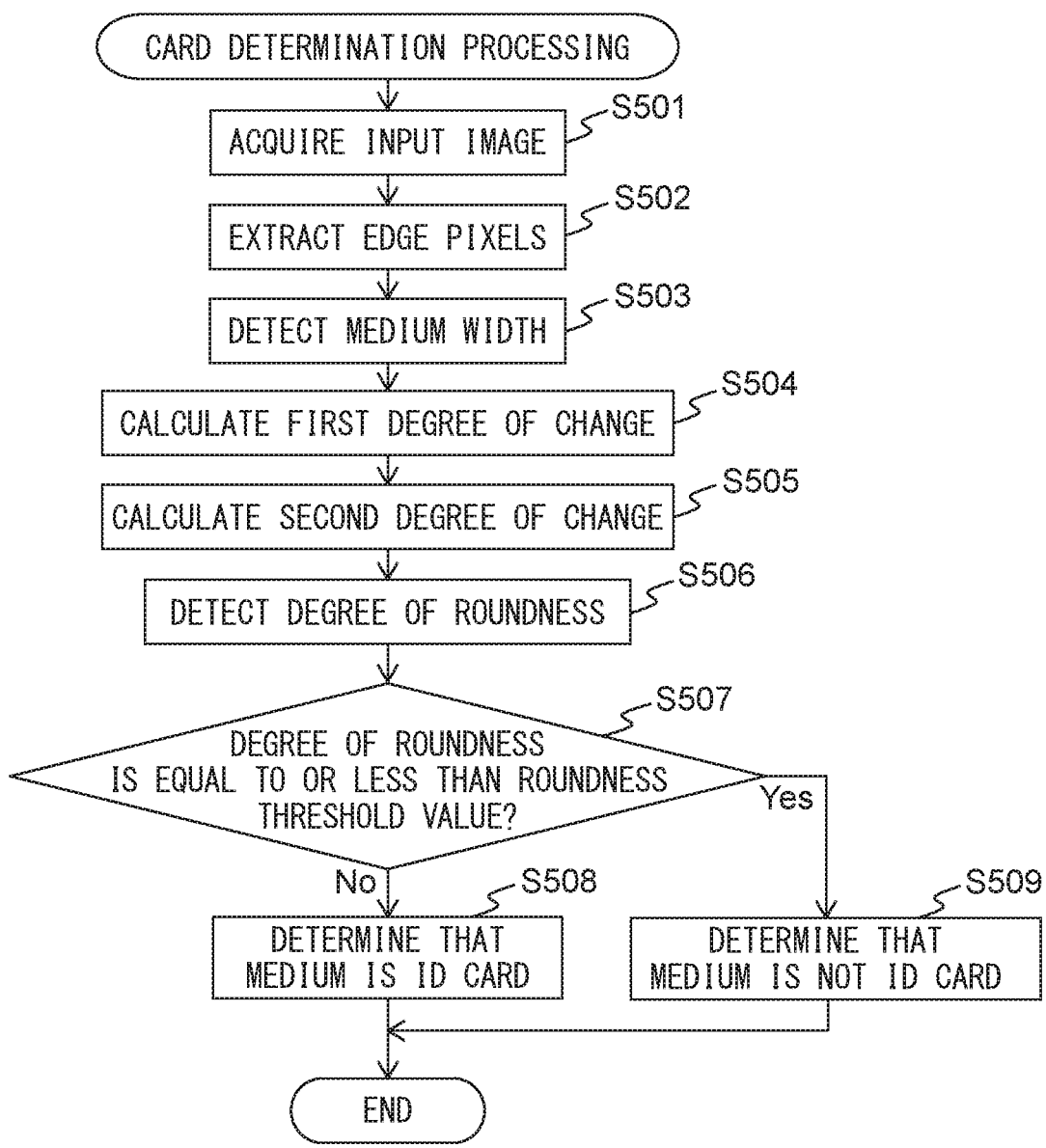
FIG. 12 is a flowchart illustrating still another operation example of card determination processing.

FIG. 12 is a flowchart illustrating an operation example of the card determination process according to still another embodiment.

The card determination processing shown in FIG. 12 is executed instead of the card determination processing shown in FIG. 6. Since the processing of steps S501 to S502, S507 to S509 in FIG. 12 is similar to the processing of steps S201 to S202, S207 to S209 in FIG. 6, detailed descriptions thereof will be omitted, and only the processing of steps S503 to S506 will be described below.

The detector 143 detects, for each line in the input image, the medium widths based on a distance between the edge pixels included in each line (step S503). The detection module 143 specifies the edge pixels located at the leftmost end side and the edge pixels located at the rightmost end side among the edge pixels included in each line, and detects the distance (the number of pixels) between the specified edge pixels as the medium width.

Next, the detection module 143 extracts a pair of two lines adjacent to each other among each line in the input image. The detection module 143 calculates, for each extracted pair, a first degree of change of the medium width which is a degree of change of the medium widths of the two lines (step S504). The detection module 143 calculates the absolute value of ratio of the change amount of the medium width in each line with respect to the distance between the two lines as the first degree of change of the medium width. The detection module 143 may calculate the absolute value of the change amount of the medium width in each line as the first degree of change of the medium width.

Next, the detection module 143 extracts two pairs adjacent to each other among the extracted pairs of the two lines. The detection module 143 calculates, for each of the extracted pairs, a second degree of change of the medium width which is a degree of change of the calculated each first degree of change of the medium width (step S505). The detection module 143 calculates the absolute value of ratio of the change amount of the first degree of change of the medium width in each line with respect to the distance between the two lines (used when calculating the first degree of change of the medium width) as the second degree of change of the medium width. The detection module 143 may calculate the absolute value of the change amount of the first degree of change of the medium width in each line as the second degree of change of the medium width. The second degree of change of the medium width calculated in this way corresponds to the second order derivative value of the medium width in each line with respect to the direction perpendicular to each line.

Figure 13A:
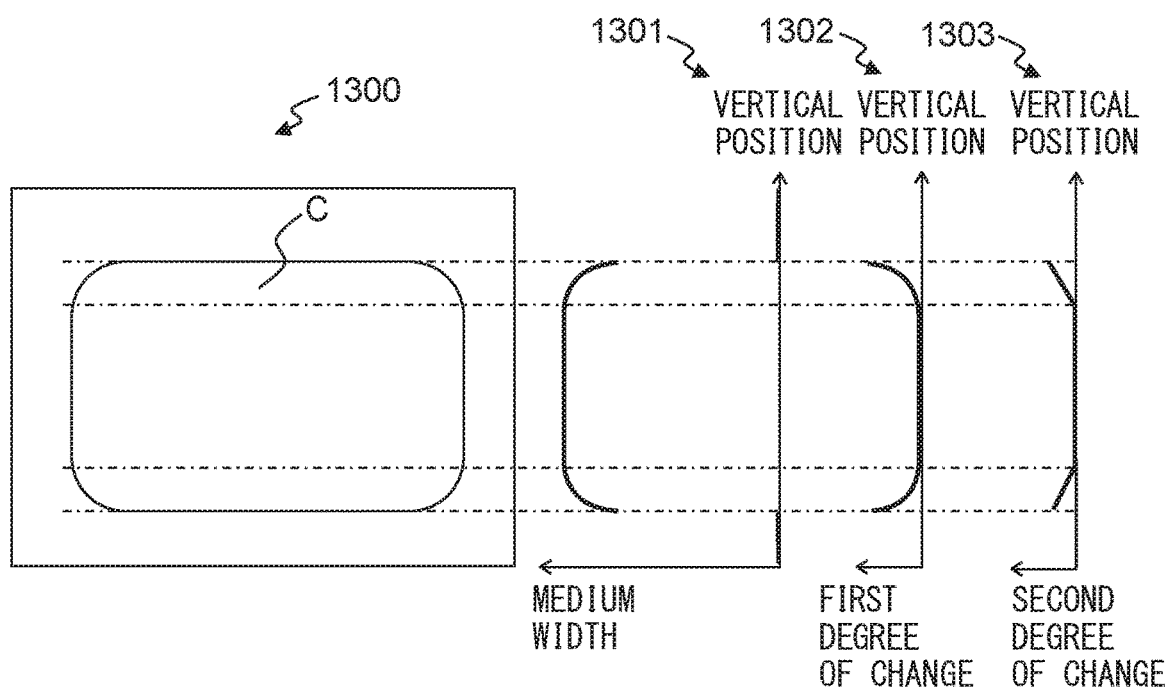
FIG. 13A is a schematic diagram for illustrating a second derivative value of each medium width.
Figure 13B:
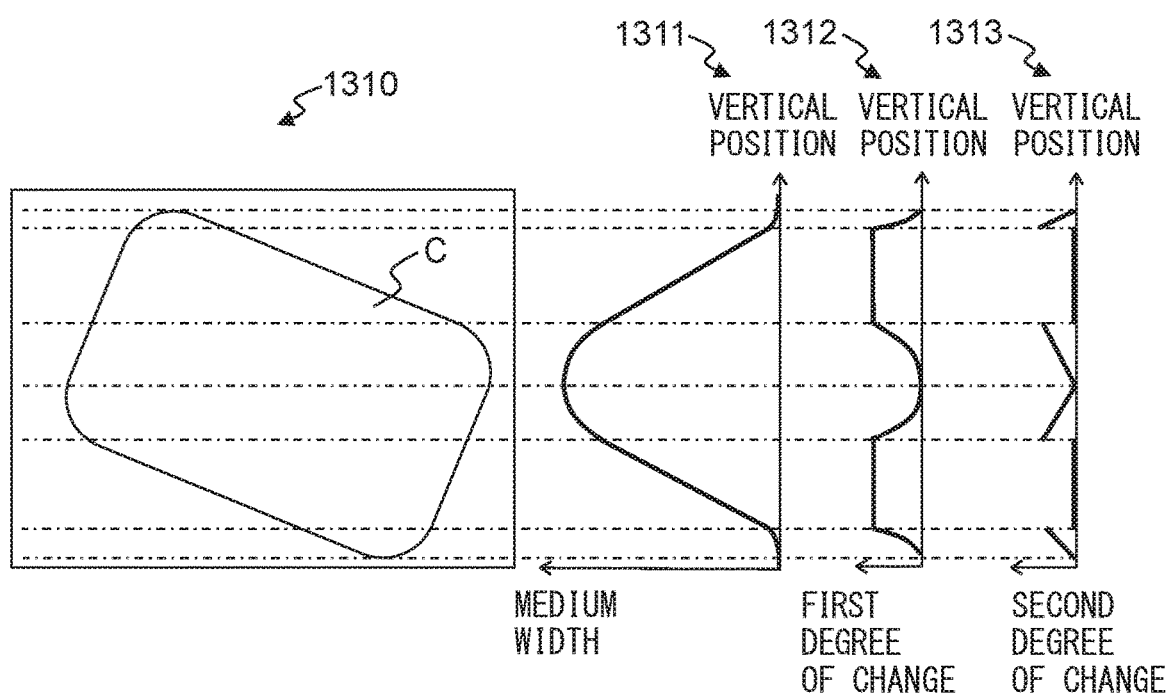
FIG. 13B is a schematic diagram for illustrating a second derivative value of each medium width.

FIGS. 13A and 13B are schematic diagrams for illustrating the second degree of change of the medium width.

The image 1300 of FIG. 13A shows an input image acquired by imaging an ID card C conveyed straight. Graph 1301 of FIG. 13A is a graph showing media widths detected from each line of input image 1300. The vertical axis of graph 1301 indicates the line position in the vertical direction in the input image, and the horizontal axis of graph 1301 indicates the media width at each line position. The graph 1302 of FIG. 13A is a graph showing the first width variation in two adjacent lines. The vertical axis of graph 1302 indicates the line position in the vertical direction in the input image, and the horizontal axis of graph 1302 indicates the second degree of change of the medium width at each line position. The graph 1303 of FIG. 13A is a graph showing the second degree of change of the medium width in two adjacent lines. The vertical axis of graph 1303 shows the line position in the vertical direction in the input image, and the horizontal axis of graph 1303 shows the second degree of change of the medium width at each line position.

As shown in graph 1302, in the ID card having roundness at the corner, the second degree of change of the medium width changes nonlinearly with respect to changes of the position in the vertical direction, in the portion corresponding to the roundness. Therefore, as shown in the graph 1303, the second degree of change of the medium width has a certain magnitude in the portion corresponding to the roundness. On the other hand, although not shown, in the paper in which the angle is right angle, the medium width does not change, and the first degree of change of the medium width and the second degree of change of the medium width in all the lines become substantially 0.

An image 1310 in FIG. 13B shows an input image acquired by imaging an ID card C conveyed in an inclined manner. Graph 1311 of FIG. 13B is a graph showing the media width detected from each line of input image 1310. The vertical axis of graph 1311 indicates the line position in the vertical direction in the input image, and the horizontal axis of graph 1311 indicates the media width at each line position. The graph 1312 of FIG. 13B is a graph showing the first degree of change of the medium width in two adjacent lines. The vertical axis of graph 1312 indicates the line position in the vertical direction in the input image, and the horizontal axis of graph 1312 indicates the first degree of change of the medium width at each line position. The graph 1313 of FIG. 13B is a graph showing the second degree of change of the medium width in two adjacent lines. The vertical axis of graph 1313 shows the line position in the vertical direction in the input image, and the horizontal axis of graph 1313 shows the second degree of change of the medium width at each line position.

As shown in graph 1312, in the ID card having roundness at the corner, the first degree of change of the medium width changes nonlinearly with respect to changes of the position in the vertical direction, in the portion corresponding to the roundness. Therefore, as shown in the graph 1313, the second degree of change of the medium width has a certain magnitude in the portion corresponding to the roundness. On the other hand, although not shown, in the paper in which the angle is right angle, since the medium width varies linearly except at the four points corresponding to the corners, the first degree of change of the medium width in each line becomes a constant value and the second degree of change of the medium width becomes approximately 0.

Therefore, the detection module 143 can accurately detect the degree of roundness at the corner of the medium included in the input image based on the second degree of change of the medium width in each line.

Next, the detection module 143 detects the degree of roundness at the corners of the medium in the input image based on the second degree of change of the medium width in each line (step S506). For example, the detection module 143 extracts lines whose order is from first predetermined order to second predetermined order in descending order of the second degree of change of the medium width. The first predetermined order is the order of the fifth or subsequent order. By setting the first predetermined order to the fifth or subsequent order, the influence of the second degree of change of the medium width calculated from the four points corresponding to the corners of the sheet is removed. The second predetermined order is the order of the first predetermined order or subsequent order. The detection module 143 calculates a statistical value (average value, median value, mode value, maximum value or minimum value, etc.) of the second degree of change of the medium width in each extracted line. The detection module 143 may calculate the number of lines having the second degree of change of the medium width larger than the predetermined threshold value as the statistical value of the second degree of change of the medium width in each line.

The degree of roundness is a value indicating a degree close to the ideal value of the roundness at the corner of the ID card, and the detection module 143 calculates the degree of roundness so that the degree of roundness becomes higher as the calculated statistical value is close to the ideal value of the ID card. For example, the detection module 143 calculates the inverse of the difference between the calculated statistical value and the ideal value, or a value acquired by subtracting the difference from the upper limit value, as the degree of roundness.

The ideal value in the ID card is set to the value of the statistical value calculated for the ID card specified in ISO/IEC7810 by prior experiments. The detection module 143 may set the degree of roundness to 1 when the difference between the statistical value and the ideal value is equal to or less than the predetermined threshold value, and may set the degree of roundness to 0 when the difference between the statistical value and the ideal value is larger than the predetermined threshold value. The detection module 143 may set the degree of roundness to 1 when the statistical value is equal to or larger than the ideal value, and may set the degree of roundness to 0 when the statistical value is less than the ideal value.

Instead of calculating the degree of roundness for all the lines, the detection module 143 may calculate the degree of roundness only for the line including at least one corner region of the medium. In this case, the controller 141 acquires an input image from the imaging device 118 so that the input image includes at least one rounded corner of the medium in S104 of FIG. 5. The detection module 143 detects the medium width only in the lines including at least one corner area in step S503, and calculates the second degree of change of the medium width only for the detected medium width in steps S504 and S505. Further, the detection module 143 detects the degree of roundness only for the respective lines for which the second degree of change of the medium width is calculated in the step S506. In this case, although the determination accuracy of whether or not the medium is an ID card is reduced, the medium conveying apparatus 100 can shorten the processing time of the card determination processing and determine whether or not the medium is an ID card at an early stage.

As described in detail above, the medium conveying apparatus 100 can more suitably determine whether or not the conveyed medium is an ID card even when the medium conveying apparatus 100 detects the degree of roundness at the corner of the medium based on the second degree of change of the medium width in each line.

In particular, since the medium conveying apparatus 100 detects the degree of roundness based on the second degree of change of the medium width in each line, even when the medium is conveyed in an inclined manner, the medium conveying apparatus 100 can suitably detect the degree of roundness, and suitably determine whether or not the medium is an ID card. Further, the medium conveying device 100 can efficiently detect the degree of roundness with a low calculation amount by detecting the degree of roundness based on the second degree of change of the medium width in each line, thereby the medium conveying device 100 can reduce the processing load of the card determination process.

Figure 14:
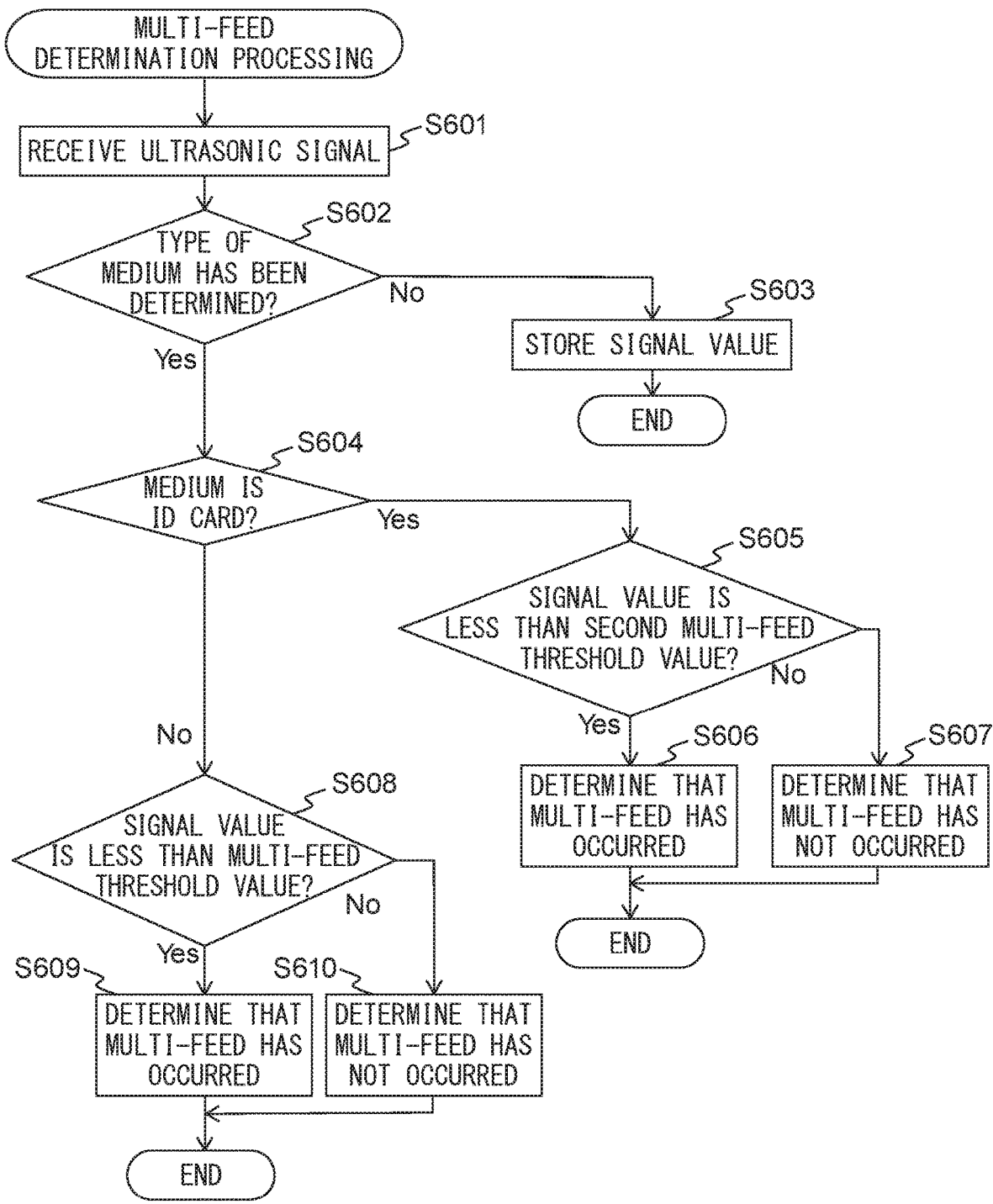
FIG. 14 is a flowchart illustrating another operation example of the multi-feed determination processing.

FIG. 14 is a flowchart illustrating an example of a part of an operation of the multi-feed determination process according to another embodiment.

The multi-feed determination processing shown in FIG. 14 is executed instead of the multi-feed determination processing shown in FIG. 8. Since the processing of steps S601 to S604, S608 to S610 in FIG. 14 is similar to the processing of steps S301 to S304, S306 to S308 in FIG. 8, detailed descriptions thereof will be omitted, and only the processing of steps S605 to S607 will be described below.

In the step S604, when it is determined that the medium is an ID card, the control module 141 determines whether or not each signal value of the ultrasonic signal acquired so far is less than the second multi-feed threshold value (step S605). The second multi-feed threshold value is set to a value between the signal value S3 of the ultrasonic signal when an ID card shown in FIG. 9 is conveyed and the signal value S2 of the ultrasonic signal when the multi-feed of the paper is occurring so that it can be determined whether an ID card is conveyed or the multi-feed of the paper is occurring. To prevent the occurrence of detection error of multi-feed, it is preferable that the multi-feed threshold value used when an ID card is not conveyed is set to a value sufficiently larger than the signal value S2 of the ultrasonic signal when the multi-feed of the paper is occurring. Therefore, the multi-feed threshold value is set to a value larger than the signal value S3 of the ultrasonic signal when the ID card is conveyed. That is, the second multi-feed threshold value when the medium is an ID card is set to a value less than the multi-feed threshold value when the medium is not an ID card.

When any of the signal values of the ultrasonic signal acquired so far is less than the second multi-feed threshold value, the control module 141 determines that the multi-feed has occurred (step S606), and ends series of steps. In this case, the control module 141 determines that multi-feed of the medium has occurred in the step S106 of FIG. 5, and controls the conveying roller to stop conveying the medium in the step S107. On the other hand, when all of the signal values of the ultrasonic signal acquired so far is equal to or larger than the second multi-feed threshold value, the control module 141 determines that the multi-feed has not occurred (step S607), and ends series of steps. In this manner, the control module 141 changes the multi-feed threshold value for determining whether or not multi-feed has occurred, according to whether or not the conveyed medium is an ID card.

As described in detail above, the medium conveying apparatus 100 can suitably determine whether or not the medium to be conveyed is an ID card, and suitably control the conveying roller even when the medium conveying apparatus 100 changes the multi-feed threshold value according to whether or not the medium is an ID card.

The medium conveying apparatus 100 may execute not only one of the card determination processes shown in FIGS. 6, 10, and 12, but also a combination of two or more of the card determination processes. In this case, the medium conveying apparatus 100 calculates the sum, product, or weighted sum of the degrees of roundness detected in each card determination process as a new degree of roundness, and determines whether or not the conveyed medium is an ID card based on whether or not the calculated new degree of roundness is larger than a roundness threshold value. As a result, the medium transport apparatus 100 can more accurately determine whether or not the medium is an ID card.

The medium conveying apparatus 100 may further determine whether or not the conveyed medium is an ID card based on the size (width and length) of the medium. In that case, when the degree of roundness is larger than the roundness threshold value, the determination module 144 calculates the size (width and length) of the medium from the distance between the intersections detected in the same manner as the step S204 of FIG. 6. The determination module 144 calculates the degree of similarity between the calculated size and the size of the ID card (85.60 mm×53.98 mm) defined by ISO/IEC7810. The degree of similarity is, for example, the inverse of the difference between the sizes. The determination module 144 determines that the conveyed medium is an ID card when the degree of similarity is equal to or larger than a preset size threshold value, and determines that the conveyed medium is not an ID card when the similarity is less than the size threshold value. As a result, the medium transport apparatus 100 can more accurately determine whether or not the medium is an ID card.

Figure 15:
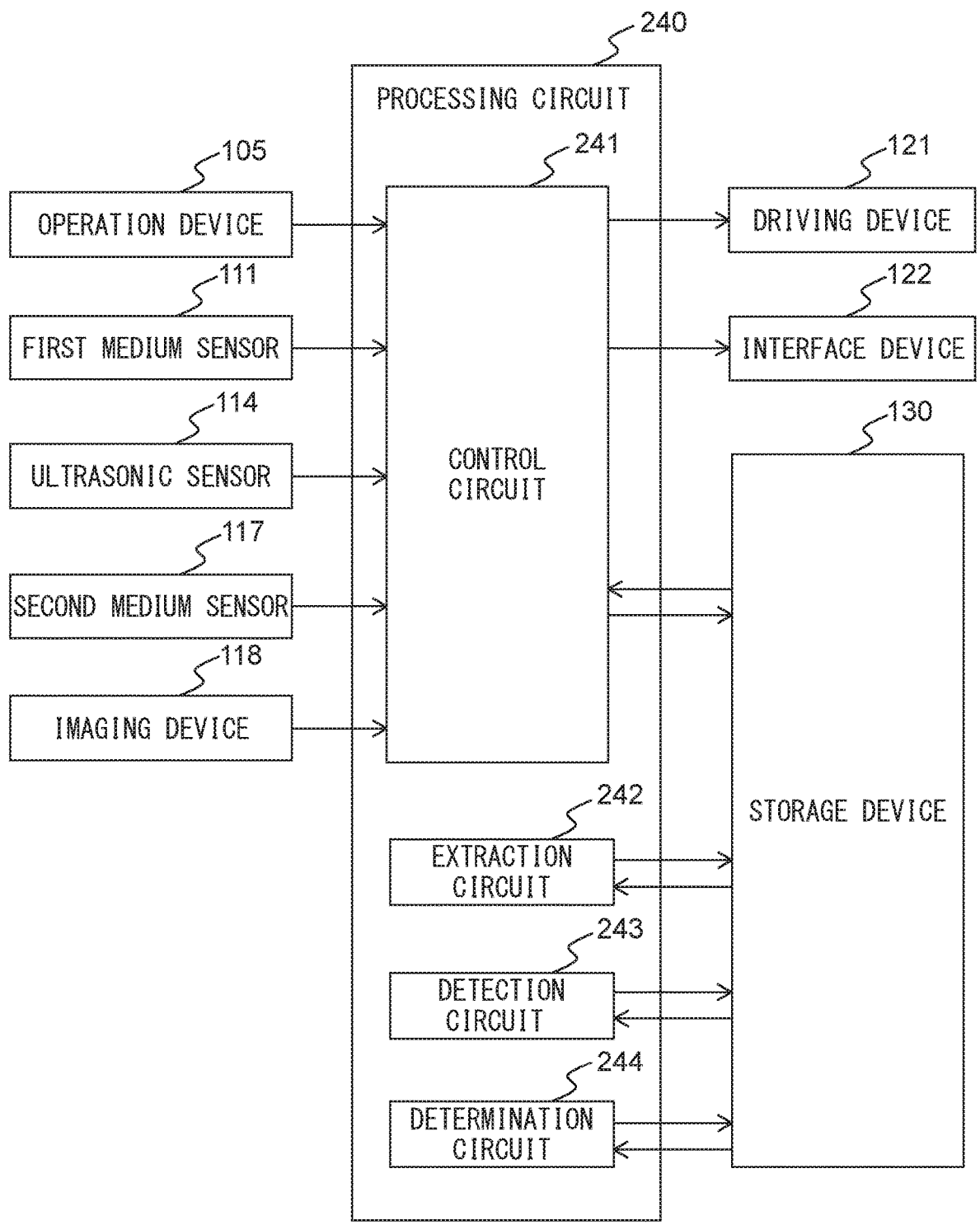
FIG. 15 is a diagram illustrating a schematic configuration of a processing circuit 240 in another medium conveying apparatus.

FIG. 15 is a diagram illustrating a schematic configuration of a processing circuit 240 in a medium conveying apparatus according to still another embodiment. The processing circuit 240 is used in place of the processing circuit 140 of the medium conveying apparatus 100 and includes a control circuit 241, an extraction circuit 242, a detection circuit 243, a determination circuit 244, etc.

Note that each unit included in the processing circuit may be configured by an independent integrated circuit, a microprocessor, firmware, etc. In addition, a part of the processing circuit may be composed of a circuit, and a part of the processing circuit may be composed of a functional module implemented by software running on a processor.

The control circuit 241 is an example of a control module, and has a functions similar to the control module 141. The control circuit 241 receives an operation signal from the operating device 105, a first medium signal from the first medium sensor 111, and a second medium signal from the second medium sensor 117, and drives the driving device 121 to control the conveying roller in response to each received signal. In addition, the control circuit 241 receives an input image from the imaging device 118 and stores it in the storage device 130, and receives a read image and outputs it to an information processing apparatus (not shown) via the interface device 122. Further, the control circuit 241 receives an ultrasonic signal from the ultrasonic sensor 114, determines whether or not multi-feed of the medium has occurred based on the ultrasonic signal, and controls the conveying roller to stop conveying the medium when it is determined that multi-feed of the medium has occurred. In addition, the control circuit 241 reads out the result of the determination as to whether or not the conveyed medium is an ID card from the storage device 130, controls the conveying roller based on the result of the determination, or outputs the result of the determination to an information processing apparatus (not shown) via the interface device 122.

The extraction circuit 242 is an example of an extraction module, and has a functions similar to the extraction module 142. The extraction circuit 242 reads an input image from the storage device 130, extracts edge pixels from the input image, and stores the extraction result in the storage device 130.

The detection circuit 243 is an example of a detection module, and has a functions similar to the detection module 143. The detection circuit 243 reads out the input image and the extraction result of the edge pixel from the storage device 130, detects the degree of roundness at the corner of the medium in the input image based on the edge pixel, and stores the detection result in the storage device 130.

The determination circuit 244 is an example of a determination module has a functions similar to the determination module 144. The determination circuit 244 reads out the detection result of the degree of roundness from the storage device 130, determines whether or not the conveyed medium is an ID card based on the degree of roundness, and stores the result of the determination in the storage device 130.

As described in detail above, even when the processing circuit 240 is used, the medium conveying apparatus can more suitably determine whether or not the conveyed medium is an ID card.

According to this embodiment, the medium conveying apparatus, the method, and the computer-readable, non-transitory medium storing the control program, can more suitably determine whether or not a conveyed medium is an ID card.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
a conveying roller to convey a medium;
an imaging device to generate an input image acquired by imaging the conveyed medium; and
a processor to:
    extract edge pixels from the input image,
    detect two straight lines substantially perpendicular to each other from the edge pixels,
    detect a degree of roundness at a corner of the medium in the input image based on a distance between an intersection of the two straight lines and predetermined edge pixels,
    determine whether the conveyed medium is an ID card based on the degree of roundness, and
    control the conveying roller based on a result of the determination or outputs the result of the determination.

2. The medium conveying apparatus according to claim 1, further comprising an ultrasonic sensor including an ultrasonic transmitter for transmitting an ultrasonic wave; and an ultrasonic receiver facing the ultrasonic transmitter for receiving the ultrasonic wave and generating an ultrasonic signal corresponding to the received ultrasonic wave, wherein the processor further
    determines whether multi-feed of the medium has occurred by comparing the ultrasonic signal with a threshold value,
    controls the conveying roller to stop conveying the medium when the processor determines that multi-feed of the medium has occurred, and
    changes the threshold value or stops determining whether multi-feed has occurred, according to whether the conveyed medium is an ID card.

3. The medium conveying apparatus according to claim 1, wherein the processor
    calculates, for each pair of two edge pixels adjacent to each other an inclination of a straight line passing through the two edge pixels,
    calculates a degree of change of the inclination, for the two pairs of edge pixels adjacent to each other, and
    detects the degree of roundness, based on the degree of change of the inclination.

4. The medium conveying apparatus according to claim 1, wherein the processor
    detects, for each line in the input image, a medium width based on a distance between edge pixels included in said each line,
    calculates, for each pair of two lines adjacent to each other, a first degree which is a degree of change of the medium widths in the two lines,
    calculates a second degree which is a degree of change of the first degrees, for two pairs of the two straight lines adjacent to each other, and
    detects the degree of roundness based on the second degree.

5. A method for determining whether a conveyed medium is an ID card, comprising:
    conveying a medium by a conveying roller;
    generating an input image acquired by imaging the conveyed medium by an imaging device;
    extracting edge pixels from the input image;
    detecting two straight lines substantially perpendicular to each other from the edge pixels;
    detecting a degree of roundness at a corner of the medium in the input image based on a distance between an intersection of the two straight lines and predetermined edge pixels;
    determining whether the conveyed medium is an ID card based on the degree of roundness; and
    controlling the conveying roller based on a result of the determination or outputting the result of the determination.

6. The method according to claim 5, further comprising:
    transmitting an ultrasonic wave;
    receiving the ultrasonic wave and generating an ultrasonic signal corresponding to the received ultrasonic wave;
    determining whether multi-feed of the medium has occurred by comparing the ultrasonic signal with a threshold value;
    controlling the conveying roller to stop conveying the medium when multi-feed of the medium has occurred; and
    changing the threshold value or stopping determining whether multi-feed has occurred, according to whether the conveyed medium is an ID card.

7. The method according to claim 5, further comprising:
calculating, for each pair of two edge pixels adjacent to each other, an inclination of a straight line passing through the two edge pixels; and
calculating a degree of change of the inclination, for two pairs of edge pixels adjacent to each other, wherein
the degree of roundness is detected based on the degree of change of the inclination.

8. The method according to claim 5, further comprising:
detecting, for each line in the input image, a medium width based on a distance between edge pixels included in said each line;
calculating, for each pair of two lines adjacent to each other, a first degree which is a degree of change of the medium widths in the two lines; and
calculating a second degree which is a degree of change of the first degrees, for two pairs of the two lines adjacent to each other, wherein
the degree of roundness is detected based on the second degree.

9. A computer-readable, non-transitory medium storing a computer program, wherein the computer program causes a medium conveying apparatus including a conveying roller to convey a medium, and an imaging device to generate an input image acquired by imaging the conveyed medium, to execute a process, the process comprising:
extracting edge pixels from the input image;
detecting two straight lines substantially perpendicular to each other from the edge pixels;
detecting a degree of roundness at a corner of the medium in the input image based on a distance between an intersection of the two straight lines and predetermined edge pixels;
determining whether the conveyed medium is an ID card based on the degree of roundness; and
controlling the conveying roller based on a result of the determination or outputting the result of the determination.

10. The computer-readable, non-transitory medium according to claim 9, wherein the medium conveying apparatus further includes an ultrasonic sensor including an ultrasonic transmitter for transmitting an ultrasonic wave and an ultrasonic receiver facing the ultrasonic transmitter for receiving the ultrasonic wave and generating an ultrasonic signal corresponding to the received ultrasonic wave, the process further comprising:
determining whether multi-feed of the medium has occurred by comparing the ultrasonic signal with a threshold value;
controlling the conveying roller to stop conveying the medium when multi-feed of the medium has occurred; and
changing the threshold value or stopping determining whether multi-feed has occurred, according to whether the conveyed medium is an ID card.

11. The computer-readable, non-transitory medium according to claim 9, the process further comprising:
calculating, for each pair of two edge pixels adjacent to each other, an inclination of a straight line passing through the two edge pixels; and
calculating a degree of change of the inclination, for two pairs of edge pixels adjacent to each other, wherein
the degree of roundness is detected based on the degree of change of the inclination.

12. The computer-readable, non-transitory medium according to claim 9, the process further comprising:
detecting, for each line in the input image, a medium width based on a distance between edge pixels included in said each line;
calculating, for each pair of two lines adjacent to each other, a first degree which is a degree of change of the medium widths in the two lines; and
calculating a second degree which is a degree of change of the first degrees, for two pairs of the two lines adjacent to each other, wherein
the degree of roundness is detected based on the second degree.

\* \* \* \* \*